(12) United States Patent
Turney et al.

(10) Patent No.: US 11,669,061 B2
(45) Date of Patent: *Jun. 6, 2023

(54) VARIABLE REFRIGERANT FLOW SYSTEM WITH PREDICTIVE CONTROL

(71) Applicant: Johnson Controls Tyco IP Holdings LLP, Milwaukee, WI (US)

(72) Inventors: Robert D. Turney, Watertown, WI (US); Nishith R. Patel, Madison, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 203 days.

This patent is subject to a terminal disclaimer.

(21) Appl. No.: 16/314,277

(22) PCT Filed: Jun. 29, 2017

(86) PCT No.: PCT/US2017/039937
§ 371 (c)(1),
(2) Date: Dec. 28, 2018

(87) PCT Pub. No.: WO2018/005760
PCT Pub. Date: Jan. 4, 2018

(65) Prior Publication Data
US 2019/0235453 A1    Aug. 1, 2019

Related U.S. Application Data

(60) Provisional application No. 62/511,809, filed on May 26, 2017, provisional application No. 62/491,059, (Continued)

(51) Int. Cl.
*G05B 15/02*    (2006.01)
*G05B 13/04*    (2006.01)
(Continued)

(52) U.S. Cl.
CPC ........... *G05B 15/02* (2013.01); *G05B 13/048* (2013.01); *G06Q 10/04* (2013.01); *G06Q 50/06* (2013.01);
(Continued)

(58) Field of Classification Search
CPC ................. G05B 15/02; G05B 13/048; G05B 2219/2642; G06Q 10/04; G06Q 50/06; G06Q 10/00; H02J 7/35
(Continued)

(56) References Cited

U.S. PATENT DOCUMENTS 7,580,775 B2   8/2009  Kulyk et al.
7,894,946 B2   2/2011  Kulyk et al.
(Continued)

FOREIGN PATENT DOCUMENTS

CN    1161753 A      10/1997
CN    104279715 A    1/2015
(Continued)

OTHER PUBLICATIONS

Arthur J Helmicki, Clas A Jacobson, and Carl N Nett. Control Oriented System Identification: a Worstcase/deterministic Approach in H1. IEEE Transactions on Automatic control, 36(10): 1163-1176, 1991. 13 pages.
(Continued)

*Primary Examiner* — Michael W Choi
(74) *Attorney, Agent, or Firm* — Foley & Lardner LLP

(57) ABSTRACT

A variable refrigerant flow (VRF) system for a building includes an outdoor VRF unit, a plurality of indoor VRF units, a battery, and a predictive VRF controller. The outdoor VRF unit includes powered VRF components configured to apply heating or cooling to a refrigerant. The indoor VRF units are configured to use the heated or cooled refrigerant to provide heating or cooling to a plurality of building zones.

(Continued)

The battery is configured to store electric energy and discharge the stored electric energy for use in powering the powered VRF components. The predictive VRF controller is configured to optimize a predictive cost function to determine an optimal amount of electric energy to purchase from an energy grid and an optimal amount of electric energy to store in the battery or discharge from the battery for use in powering the powered VRF components at each time step of an optimization period.

19 Claims, 6 Drawing Sheets

Related U.S. Application Data filed on Apr. 27, 2017, provisional application No. 62/357,338, filed on Jun. 30, 2016.

(51) Int. Cl.
- *H02J 7/35* (2006.01)
- *G06Q 50/06* (2012.01)
- *G06Q 10/04* (2023.01)
- *G06Q 10/00* (2023.01)

(52) U.S. Cl.
CPC ........ *H02J 7/35* (2013.01); *G05B 2219/2642* (2013.01); *G06Q 10/00* (2013.01)

(58) Field of Classification Search
USPC .......................................................... 700/276
See application file for complete search history.

(56) References Cited

U.S. PATENT DOCUMENTS

| | | | |
|---|---|---|---|
| 8,527,108 B2 | 9/2013 | Kulyk et al. | |
| 8,527,109 B2 | 9/2013 | Kulyk et al. | |
| 8,903,554 B2 | 12/2014 | Stagner | |
| 8,918,223 B2 | 12/2014 | Kulyk et al. | |
| 9,110,647 B2 | 8/2015 | Kulyk et al. | |
| 9,171,276 B2 | 10/2015 | Steven et al. | |
| 9,235,657 B1 | 1/2016 | Wenzel et al. | |
| 9,300,141 B2 | 3/2016 | Marhoefer | |
| 9,429,923 B2 | 8/2016 | Ward et al. | |
| 9,436,179 B1 | 9/2016 | Turney et al. | |
| 9,703,339 B2 | 7/2017 | Kulyk et al. | |
| 10,139,877 B2 | 11/2018 | Kulyk et al. | |
| 10,277,034 B2 | 4/2019 | Marhoefer | |
| 10,389,136 B2 | 8/2019 | Drees | |
| 2007/0203860 A1 | 8/2007 | Golden et al. | |
| 2008/0000241 A1* | 1/2008 | Larsen | F25B 49/02 62/117 |
| 2010/0268353 A1 | 10/2010 | Crisalle et al. | |
| 2012/0022702 A1 | 1/2012 | Jang | |
| 2012/0130556 A1 | 5/2012 | Marhoefer | |
| 2013/0162037 A1* | 6/2013 | Kim | H02J 3/14 307/24 |
| 2013/0245847 A1 | 9/2013 | Steven et al. | |
| 2013/0346139 A1 | 12/2013 | Steven et al. | |
| 2014/0039709 A1 | 2/2014 | Steven et al. | |
| 2014/0094979 A1 | 4/2014 | Mansfield | |
| 2014/0188295 A1 | 7/2014 | Saito et al. | |
| 2014/0277761 A1 | 9/2014 | Matsuoka et al. | |
| 2014/0330611 A1 | 11/2014 | Steven et al. | |
| 2014/0330695 A1 | 11/2014 | Steven et al. | |
| 2014/0365017 A1 | 12/2014 | Hanna et al. | |
| 2015/0088576 A1 | 3/2015 | Steven et al. | |
| 2015/0094968 A1 | 4/2015 | Jia et al. | |
| 2015/0176848 A1 | 6/2015 | Jung et al. | |
| 2015/0267932 A1 | 9/2015 | Kim et al. | |
| 2015/0277467 A1 | 10/2015 | Steven et al. | |
| 2015/0316902 A1 | 11/2015 | Wenzel et al. | |
| 2015/0316907 A1 | 11/2015 | Elbsat et al. | |
| 2015/0378381 A1 | 12/2015 | Tinnakornsrisuphap et al. | |
| 2016/0091904 A1* | 3/2016 | Horesh | F24F 11/30 700/276 |
| 2016/0098022 A1 | 4/2016 | Wenzel et al. | |
| 2016/0109147 A1 | 4/2016 | Uno et al. | |
| 2016/0146491 A1 | 5/2016 | Ettl et al. | |
| 2016/0146493 A1 | 5/2016 | Ettl et al. | |
| 2016/0172859 A1 | 6/2016 | Marhoefer | |
| 2016/0180474 A1 | 6/2016 | Steven et al. | |
| 2016/0203569 A1 | 7/2016 | Forbes et al. | |
| 2016/0245539 A1 | 8/2016 | Motomura et al. | |
| 2016/0305678 A1* | 10/2016 | Pavlovski | G05B 13/048 |
| 2016/0313019 A1 | 10/2016 | Mengle et al. | |
| 2016/0313751 A1 | 10/2016 | Risbeck et al. | |
| 2016/0322835 A1 | 11/2016 | Carlson et al. | |
| 2016/0377306 A1 | 12/2016 | Drees et al. | |
| 2017/0030598 A1 | 2/2017 | Burns et al. | |
| 2017/0102162 A1 | 4/2017 | Drees et al. | |
| 2017/0102675 A1 | 4/2017 | Drees | |
| 2017/0104337 A1 | 4/2017 | Drees | |
| 2017/0104449 A1 | 4/2017 | Drees | |
| 2017/0234559 A1* | 8/2017 | Federspiel | G05B 13/026 700/278 |
| 2017/0237259 A1 | 8/2017 | Yoon et al. | |
| 2017/0350625 A1 | 12/2017 | Burns et al. | |
| 2018/0004171 A1 | 1/2018 | Patel et al. | |
| 2018/0100668 A1 | 4/2018 | Huang | |
| 2018/0180337 A1 | 6/2018 | Luo et al. | |
| 2018/0195741 A1 | 7/2018 | Field et al. | |
| 2018/0196456 A1 | 7/2018 | Elbsat | |
| 2018/0197253 A1 | 7/2018 | Elbsat et al. | |
| 2018/0224814 A1 | 8/2018 | Elbsat et al. | |
| 2018/0285800 A1 | 10/2018 | Wenzel et al. | |
| 2018/0340700 A1 | 11/2018 | Chen et al. | |
| 2018/0372623 A1 | 12/2018 | Turney et al. | |
| 2019/0115785 A1 | 4/2019 | Kallamkote et al. | |
| 2020/0059098 A1 | 2/2020 | Dong et al. | |
| 2020/0393860 A1 | 12/2020 | Corbin | |
| 2022/0268471 A1 | 8/2022 | Turney et al. | |

FOREIGN PATENT DOCUMENTS

| | | | |
|---|---|---|---|
| CN | 104319766 A | | 1/2015 |
| CN | 104898422 A | | 9/2015 |
| JP | 2005-092584 | | 4/2005 |
| JP | 2012-080679 A | | 4/2012 |
| JP | 2013-142494 | | 7/2013 |
| JP | 2014-027784 A | | 2/2014 |
| JP | 2014-047989 A | | 3/2014 |
| JP | 2014-096946 | | 5/2014 |

OTHER PUBLICATIONS

Diederik Kingma and Jimmy Ba. Adam: A Method for Stochastic Optimization. In International Conference on Learning Representations (ICLR), 2015, 15 pages.

George EP Box, Gwilym M Jenkins, Gregory C Reinsel, and Greta M Ljung. Time Series Analysis: Forecasting and Control. John Wiley & Sons, 2015, chapters 13-15. 82 pages.

Jie Chen and Guoxiang Gu. Control-oriented System Identification: an H1 Approach, vol. 19. Wiley-Interscience, 2000, chapters 3 & 8, 38 pages.

Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 11 pages.

K. J. Astrom. Optimal Control of Markov Decision Processes with Incomplete State Estimation. J. Math. Anal. Appl., 10:174-205, 1965.31 pages.

Kelman and F. Borrelli. Bilinear Model Predictive Control of a HVAC System Using Sequential Quadratic Programming. In Proceedings of the 2011 IFAC World Congress, 2011, 6 pages.

Lennart Ljung and Torsten Soderstrom. Theory and practice of recursive identification, vol. 5. JSTOR, 1983, chapters 2, 3 & 7, 80 pages.

(56) References Cited

OTHER PUBLICATIONS

Lennart Ljung, editor. System Identification: Theory for the User (2nd Edition). Prentice Hall, Upper Saddle River, New Jersey, 1999, chapters 5 and 7, 40 pages.
Moritz Hardt, Tengyu Ma, and Benjamin Recht. Gradient Descent Learns Linear Dynamical Systems. arXiv preprint arXiv: 1609.05191, 2016, 44 pages.
Nevena et al. Data center cooling using model-predictive control, 10 pages. 2018.
Sergio Bittanti, Marco C Campi, et al. Adaptive Control of Linear Time Invariant Systems: The "Bet on the Best" Principle. Communications in Information & Systems, 6(4):299-320, 2006. 21 pages.
Yudong Ma, Anthony Kelman, Allan Daly, ana Francesco Borrelli. Predictive Control for Energy Efficient Buildings with Thermal Storage: Modeling, Stimulation, and Experiments. IEEE Control Systems, 32(1):44-64, 2012. 20 pages.
Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012.7 pages.
Afram et al., Theory and applications of HVAC control Systems—A review of model predictive control (MPC), Building and Environment, Feb. 1, 2014, pp. 343-355.
Ma et al., Predictive Control for Energy Efficient Buildings with Thermal Storage: Modeling, Stimulation, and Experiments, IEEE Control Systems, Feb. 1, 2012, pp. 44-64.
Morosan et al., Building temperature regulation using a distributed model predictive control, Energy and Buildings, Sep. 1, 2010, pp. 1445-1452.
Search Report for International Application No. PCT/US2017/039798, dated Sep. 15, 2017, 15 pages.
Search Report for International Application No. PCT/US2017/039937, dated Sep. 21, 2017, 16 pages.
Search Report for International Application No. PCT/US2018/029625, dated Aug. 2, 2018, 14 pages.
Zhao et al., An Energy Management System for Building Structures Using a Multi-Agent Decision-Making Control Methodology, Jan./Feb. 2013, 9 pages.
Berggren et al., LCE analysis of buildings—Taking the step towards Net Zero Energy Buildings, Nov. 30, 2012, Energy and Buildings 62 (2013) 381-391. (Year: 2012).
Carrasco et al., Power Electronic Systems for the Grid Interaction of Renewable Energy Sources: a Survey, Jun. 2006, IEEE Transactions on Industrial Electronics, vol. 53 Iss. 4, Year 2006.
Cellura et al., Energy life-cycle approach in Net zero energy buildings balance: Cross Mark Operation and embodied energy of an Italian case study, May 4, 2013, Energy and Buildings 72 (2014) 371-381. (Year: 2013).
Cordiner et al., A study on the energy management in domestic micro-grids based on Model Predictive Control strategies, Feb. 25, 2015, Energy Conversion and Management 102 (2015) 50-58, (Year 2015).
Gelazanskas et al., Demand side management in smart grid: A review and proposals for future direction, Sustainable Cities and Society 11, Year 2014, pp. 22-30.

Hamdy et al., A multi-stage optimization method for cost-optimal and nearly-zero-energy building solutions in line with the EPBD-recast 201 O, Apr. 4, 2012, Energy and Bui ldings 56 (2013) 189-203. (Year: 2012).
Li et al., Zero energy buildings and sustainable development implications—A review, Aug. 28, 2012, Energy 54 (2013) 1-10. (Year: 2012).
Lu et al., Design optimization and optimal control of grid-connected and standalone nearly/net zero energy buildings, Apr. 21, 2015, Applied Energy 155 (2015) 463-477. (Year: 2015).
Pikas et al., "Cost optimal and nearly zero energy building solutions for office buildings", Aug. 27, 2013, Energy and Buildings 74 (2014) 30-42. (Year: 2013).
Ma et. al., "Predictive Control for Energy Efficient Buildings with Thermal Storage: Modeling, Stimulation, and Experiments", IEEE Control Systems, vol. 32, No. 1, Feb. 2012, pp. 44-49.
Office Action on CN 201780040984.8, dated Mar. 25, 2020, 19 pages with translation.
Zhao et al., "An Energy Management System for Building Structures Using a Multi-Agent Decision-Making Control Methodology", IEEE Transactiona on Industry Applications, vol. 49, No. 1, Jan./Feb. 2013, pp. 322-330.
Office Action on JP 2018-567668, dated Mar. 9, 2021, 10 pages with English language translation.
Office Action on JP 2018-567674, dated Mar. 2, 2021, 8 pages.
Office Action on CN 201780041246.5, dated May 17, 2021, 27 pages with English language translation.
HOMER Energy, "HOMER Grid: How Grid Calculates Demand Charge and Energy Bills Savings," URL: https://www.homerenergy.com/products/grid/docs/latest/how_grid_calculates_demand_charge_and_energy_bills_savings.html, retrieved Dec. 2020, 1 page.
HOMER Energy, "HOMER Grid: Solving Problems with HOMER Software," URL: https://www.homerenergy.com/products/grid/docs/latest/solving_problems_with_homer_software.html, retrieved Dec. 2019, 1 page.
HOMER Energy, "HOMER Grid: Welcome to HOMER Grid," URL: https://www.homerenergy.com/products/grid/docs/latest/index.html, retrieved Dec. 2020, 1 page.
JP Office Action on JP Appl. Ser. No. 2018-567668 dated Nov. 30, 2021 (6 pages).
CN Office Action on CN Appl. Ser. No. 201780041246.5 dated Mar. 3, 2022 (10 pages).
Ferrarini et al., "A Distributed Model Predictive Control approach for the integration of flexible loads, storage and renewables," IEEE, 2014 (6 pages).
Rahmani-Andebili et al., "Energy Scheduling for a Smart Home Applying Stochastic Model Predictive Control," IEEE, 2016 (6 pages).
Zong et al., "Model Predictive Controller for Active Demand Side Management with PV Self-consumption in an Intelligent Building," 3rd IEEE PES Innovative Smart Grid Technologies Europe (ISGT Europe), Berlin, 2012 (8 pages).
CN Office Action on CN Appl. Ser. No. 201780041246.5 dated Jul. 11, 2022 (10 pages).
JP Office Action on JP Appl. Ser. No. 2018-567668 dated Jun. 7, 2022, with translation (12 pages).
Kuraura, Takeshi, "Transition of Variable Refrigerative Flow," Japan Society of Refrigerating and Air Conditioning Engineers, Sep. 2010, vol. 85, No. 995 (6 pages).

\* cited by examiner

VARIABLE REFRIGERANT FLOW SYSTEM WITH PREDICTIVE CONTROL

CROSS-REFERENCE TO RELATED PATENT APPLICATIONS

This application is a U.S. National Stage Application of PCT/US2017/039937, filed Jun. 29, 2017, which claims the benefit of and priority to U.S. Provisional Patent Application No. 62/357,338 filed Jun. 30, 2016, U.S. Provisional Patent Application No. 62/491,059 filed Apr. 27, 2017, and U.S. Provisional Patent Application No. 62/511,809 filed May 26, 2017. The entire disclosure of each of these patent applications is incorporated by reference herein.

BACKGROUND

The present disclosure relates generally to a HVAC system for a building and more particularly to a variable refrigerant flow (VRF) system for use as part of a building HVAC system.

VRFs typically include an outdoor VRF unit and a plurality of indoor VRF units. The outdoor VRF unit can be located outside the building (e.g., on a rooftop) and can operate to heat or cool a refrigerant. The outdoor VRF unit may include one or more compressors, a fan, or other powered VRF components configured to apply heating or cooling to the refrigerant. The indoor VRF units can be distributed throughout various building zones within a building and can receive the heated or cooled refrigerant from the outdoor VRF unit. Each indoor VRF unit can provide temperature control for the particular building zone in which the indoor VRF unit is located.

VRF systems may include several components that consume power during operation. For example, an outdoor VRF unit may include a compressor configured to circulate a refrigerant through a heat exchanger and fan configured to modulate an airflow through the heat exchanger. Each indoor VRF unit may include a fan configured to provide an airflow to a building zone. It would be desirable to minimize the power consumption of these and other power-consuming components in order to reduce the cost of energy consumed by the VRF system.

SUMMARY

One implementation of the present disclosure is a variable refrigerant flow (VRF) system for a building. The VRF system includes an outdoor VRF unit, a plurality of indoor VRF units, a battery, and a predictive VRF controller. The outdoor VRF unit includes one or more powered VRF components configured to apply heating or cooling to a refrigerant. The indoor VRF units are configured to receive the heated or cooled refrigerant from the outdoor VRF unit and to use the heated or cooled refrigerant to provide heating or cooling to a plurality of building zones. The battery is configured to store electric energy and discharge the stored electric energy for use in powering the powered VRF components. The predictive VRF controller is configured to optimize a predictive cost function to determine an optimal amount of electric energy to purchase from an energy grid and an optimal amount of electric energy to store in the battery or discharge from the battery for use in powering the powered VRF components at each time step of an optimization period.

In some embodiments, the VRF system includes one or more photovoltaic panels configured to collect photovoltaic energy. The predictive VRF controller may be configured to determine an optimal amount of the photovoltaic energy to store in the battery and an optimal amount of the photovoltaic energy to be consumed by the powered VRF components at each time step of the optimization period.

In some embodiments, the outdoor VRF unit includes a refrigeration circuit including a heat exchanger, a compressor configured to circulate the refrigerant through the heat exchanger, and a fan configured to modulate a rate of heat transfer in the heat exchanger. The powered VRF components may include the compressor and the fan. The predictive cost function may account for a cost of operating the compressor and the fan at each time step of the optimization period.

In some embodiments, the predictive cost function accounts for a cost of the electric energy purchased from the energy grid and a cost savings resulting from discharging stored electric energy from the battery at each time step of the optimization period.

In some embodiments, the predictive VRF controller is configured to receive energy pricing data defining a cost per unit of electric energy purchased from the energy grid at each time step of the optimization period and use the energy pricing data as inputs to the predictive cost function.

In some embodiments, the predictive cost function accounts for a demand charge based on a maximum power consumption of the VRF system during a demand charge period that overlaps at least partially with the optimization period. The predictive VRF controller may be configured to receive energy pricing data defining the demand charge and to use the energy pricing data as inputs to the predictive cost function.

In some embodiments, the predictive VRF controller includes an economic controller configured to determine optimal power setpoints for the powered VRF components and for the battery at each time step of the optimization period, a tracking controller configured to use the optimal power setpoints to determine optimal temperature setpoints for the building zones or the refrigerant at each time step of the optimization period, and an equipment controller configured to use the optimal temperature setpoints to generate control signals for the powered VRF components and for the battery at each time step of the optimization period.

Another implementation of the present disclosure is a variable refrigerant flow (VRF) system for a building. The VRF system includes an outdoor VRF unit, a plurality of indoor VRF units, and a predictive VRF controller. The outdoor VRF unit includes one or more powered VRF components configured to apply heating or cooling to a refrigerant. The indoor VRF units are configured to receive the heated or cooled refrigerant from the outdoor VRF unit and to use the heated or cooled refrigerant to provide heating or cooling to a plurality of building zones. The predictive VRF controller is configured to optimize a predictive cost function to determine an optimal amount of electric energy to purchase from an energy grid and an optimal amount of electric energy to be consumed by the powered VRF components at each time step of an optimization period.

In some embodiments, the VRF system includes one or more photovoltaic panels configured to collect photovoltaic energy. The predictive VRF controller may be configured to determine an optimal amount of the photovoltaic energy to store in the battery and an optimal amount of the photovoltaic energy to be consumed by the powered VRF components at each time step of the optimization period.

In some embodiments, the outdoor VRF unit includes a refrigeration circuit including a heat exchanger, a compressor configured to circulate the refrigerant through the heat exchanger, and a fan configured to modulate a rate of heat transfer in the heat exchanger. The powered VRF components may include the compressor and the fan. The predictive cost function may account for a cost of operating the compressor and the fan at each time step of the optimization period.

In some embodiments, wherein the predictive cost function accounts for a cost of the electric energy purchased from the energy grid at each time step of the optimization period.

In some embodiments, the predictive VRF controller is configured to receive energy pricing data defining a cost per unit of electric energy purchased from the energy grid at each time step of the optimization period and use the energy pricing data as inputs to the predictive cost function.

In some embodiments, the predictive cost function accounts for a demand charge based on a maximum power consumption of the VRF system during a demand charge period that overlaps at least partially with the optimization period. The predictive VRF controller may be configured to receive energy pricing data defining the demand charge and to use the energy pricing data as inputs to the predictive cost function.

In some embodiments, the predictive VRF controller includes an economic controller configured to determine optimal power setpoints for the powered VRF components at each time step of the optimization period, a tracking controller configured to use the optimal power setpoints to determine optimal temperature setpoints for the building zones or the refrigerant at each time step of the optimization period, and an equipment controller configured to use the optimal temperature setpoints to generate control signals for the powered VRF components at each time step of the optimization period.

Another implementation of the present disclosure is a method for operating a variable refrigerant flow (VRF) system. The method includes receiving, at a predictive controller of the VRF system, energy pricing data defining energy prices for each of a plurality of time steps in an optimization period and using the energy pricing data as inputs to a predictive cost function that defines a cost of operating the VRF system over a duration of the optimization period. The method includes optimizing the predictive cost function to determine optimal power setpoints for one or more powered components of the VRF system and for a battery of the VRF system and using the optimal power setpoints to generate temperature setpoints for a zone temperature or refrigerant temperature affected by the VRF system. The method includes using the temperature setpoints to generate control signals for the powered components of the VRF system and operating the powered components of the VRF system to achieve the temperature setpoints.

In some embodiments, optimizing the predictive cost function includes determining an optimal amount of electric energy to purchase from an energy grid and an optimal amount of electric energy to store in the battery or discharge from the battery for use in powering the powered components of the VRF system at each time step of an optimization period.

In some embodiments, the method includes operating a refrigeration circuit in an outdoor VRF unit of the VRF system to apply heating or cooling to a refrigerant. The refrigeration circuit may include a heat exchanger, a compressor configured to circulate the refrigerant through the heat exchanger, and a fan configured to modulate a rate of heat transfer in the heat exchanger. The powered components of the VRF system may include the compressor and the fan of the outdoor VRF unit. The predictive cost function may account for a cost of operating the compressor and the fan at each time step of the optimization period.

In some embodiments, the method includes operating a fan of an indoor VRF unit of the VRF system to transfer heat between the refrigerant and one or more building zones. The powered components of the VRF system may include the fan of the indoor VRF unit.

In some embodiments, the predictive cost function accounts for a demand charge based on a maximum power consumption of the VRF system during a demand charge period that overlaps at least partially with the optimization period. The method may include using the energy pricing data as inputs to the predictive cost function to define the demand charge.

In some embodiments, the method includes obtaining photovoltaic energy from one or more photovoltaic panels of the VRF system and determining an optimal amount of the photovoltaic energy to store in the battery and an optimal amount of the photovoltaic energy to be consumed by the powered components of the VRF system at each time step of the optimization period.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Figure 1:
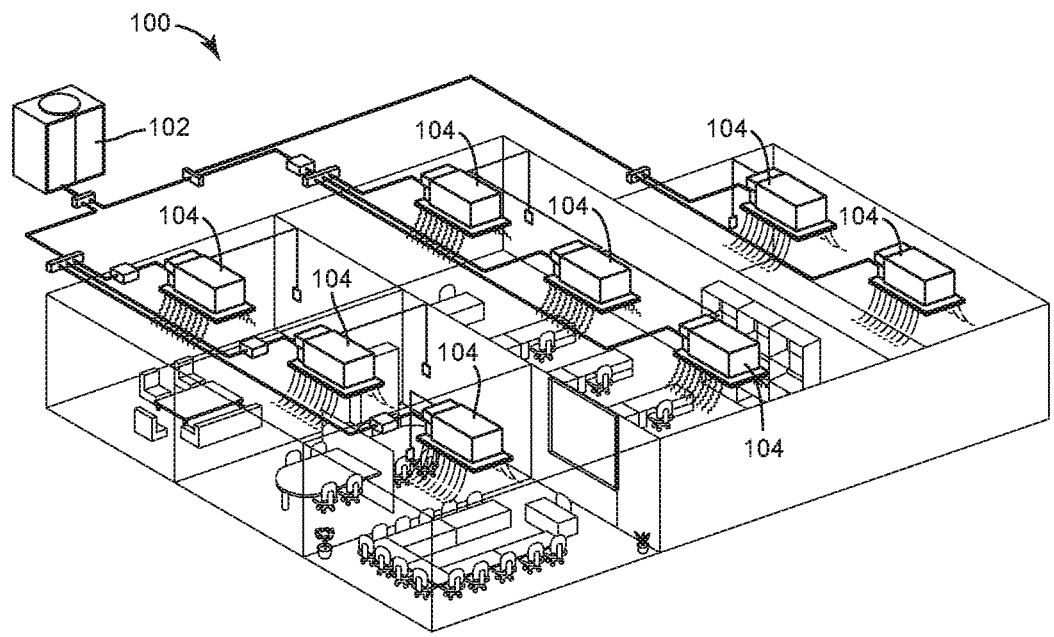
FIG. 1 is a drawing of a variable refrigerant flow (VRF) system including an outdoor VRF unit and a plurality of indoor VRF units, according to an exemplary embodiment.

Referring generally to the FIGURES, a variable refrigerant flow (VRF) system with a predictive controller and components thereof are shown, according to various exemplary embodiments. The VRF system can be used as a building HVAC system to provide heating and/or cooling to building zones. The VRF system may include one or more outdoor VRF units and a plurality of indoor VRF units. The outdoor VRF units can be located outside the building (e.g., on a rooftop) and can operate to heat or cool a refrigerant. The outdoor VRF units may include one or more compressors, a fan, or other powered VRF components configured to apply heating or cooling to the refrigerant. In some embodiments, the outdoor VRF units include photovoltaic panels configured to collect solar energy and convert the solar energy into electric energy. The indoor VRF units can be distributed throughout various building zones within a building and can receive the heated or cooled refrigerant from the outdoor VRF units. Each indoor VRF unit can provide temperature control for the particular building zone in which the indoor VRF unit is located.

The outdoor VRF units may include batteries configured to store electric energy (i.e., electricity) and to discharge the stored electric energy for use in powering the powered VRF components. The electric energy can be purchased from the energy grid and/or collected by the photovoltaic panels. In some embodiments, the batteries store energy during time periods when energy prices are low and discharge the stored energy when energy prices are high to reduce the cost of energy consumed by the VRF system. The batteries can be controlled by a predictive controller configured to optimize the cost of operating the VRF system.

The VRF system may include a predictive controller configured to generate and provide control signals to the powered VRF components and to the battery. In some embodiments, the predictive controller uses a multi-stage optimization technique to generate the control signals. For example, the predictive controller may include an economic controller configured to determine the optimal amount of power to be consumed by the powered VRF components at each time step during the optimization period. The optimal amount of power to be consumed may minimize a cost function that accounts for the cost of energy consumed by the VRF system over the duration of the optimization period. The cost of energy may be based on time-varying energy prices from an electric utility (e.g., electricity prices, demand prices, etc.). In some embodiments, the economic controller is configured to determine an optimal amount of power to purchase from the energy grid (i.e., a grid power setpoint $P_{sp,grid}$) and an optimal amount of power to store or discharge from the battery (i.e., a battery power setpoint $P_{sp,bat}$) at each time step of the optimization period.

In some embodiments, the predictive controller includes a tracking controller configured to generate temperature setpoints (e.g., a zone temperature setpoint $T_{sp,zone}$, a supply air temperature setpoint $T_{sp,sa}$, a refrigerant temperature setpoint $T_{sp,ref}$, etc.) that achieve the optimal amount of power consumption at each time step. In some embodiments, the predictive controllers use equipment models for the powered VRF components to determine an amount of heating or cooling that can be generated by the powered VRF components based on the optimal amount of power consumption. The predictive controller can use a zone temperature model in combination with weather forecasts from a weather service to predict how the temperature of the building zone $T_{zone}$ will change based on the power setpoints and/or the temperature setpoints.

In some embodiments, the predictive controller includes an equipment controller configured to use the temperature setpoints to generate control signals for the powered VRF components. The control signals may include on/off commands, speed setpoints for the fan or compressor, position setpoints for actuators and valves, or other operating commands for individual devices of powered VRF components. For example, the equipment controller may receive a measurement of the refrigerant temperature $T_{ref}$ from a refrigerant temperature sensor and/or a measurement the zone temperature $T_{zone}$ from a zone temperature sensor. The equipment controller can use a feedback control process (e.g., PID, ESC, MPC, etc.) to adjust the speed of the fan or compressor of the outdoor VRF units to drive the measured temperatures to the temperature setpoints. These and other features of the VRF system are described in greater detail below.

Variable Refrigerant Flow System

Figure 2:
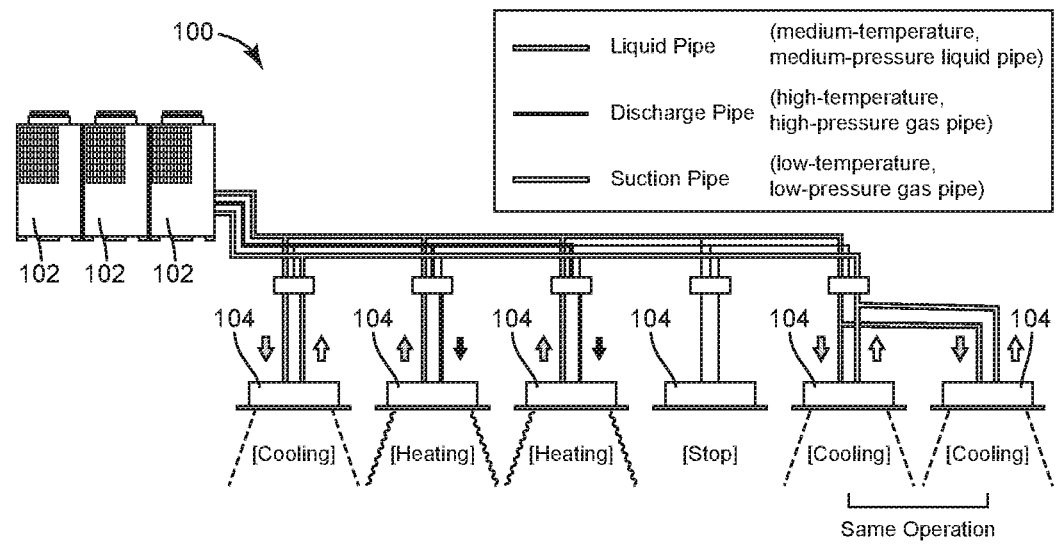
FIG. 2 is another drawing of the VRF system of FIG. 1 illustrating some of the indoor VRF units operating in a cooling mode while other of the indoor VRF units operate in a heating mode, according to an exemplary embodiment.

Referring now to FIGS. 1-2, a variable refrigerant flow (VRF) system 100 is shown, according to some embodiments. VRF system 100 is shown to include one or more outdoor VRF units 102 and a plurality of indoor VRF units 104. Outdoor VRF units 102 can be located outside a building and can operate to heat or cool a refrigerant. Outdoor VRF units 102 can consume electricity to convert refrigerant between liquid, gas, and/or super-heated gas phases. Indoor VRF units 104 can be distributed throughout various building zones within a building and can receive the heated or cooled refrigerant from outdoor VRF units 102. Each indoor VRF unit 104 can provide temperature control for the particular building zone in which the indoor VRF unit 104 is located.

One advantage of VRF system 100 is that some indoor VRF units 104 can operate in a cooling mode while other indoor VRF units 104 operate in a heating mode. For example, each of outdoor VRF units 102 and indoor VRF units 104 can operate in a heating mode, a cooling mode, or an off mode. Each building zone can be controlled independently and can have different temperature setpoints. In some embodiments, each building has up to three outdoor VRF units 102 located outside the building (e.g., on a rooftop) and up to 128 indoor VRF units 104 distributed throughout the building (e.g., in various building zones).

Many different configurations exist for VRF system 100. In some embodiments, VRF system 100 is a two-pipe system in which each outdoor VRF unit 102 connects to a single refrigerant return line and a single refrigerant outlet line. In a two-pipe system, all of outdoor VRF units may 102 operate in the same mode since only one of a heated or chilled refrigerant can be provided via the single refrigerant outlet line. In other embodiments, VRF system 100 is a three-pipe system in which each outdoor VRF unit 102 connects to a refrigerant return line, a hot refrigerant outlet line, and a cold refrigerant outlet line. In a three-pipe system, both heating and cooling can be provided simultaneously via the dual refrigerant outlet lines. An example of a three-pipe VRF system is described in detail with reference to FIG. 4.

VRF System with Predictive Controller

Figure 3:
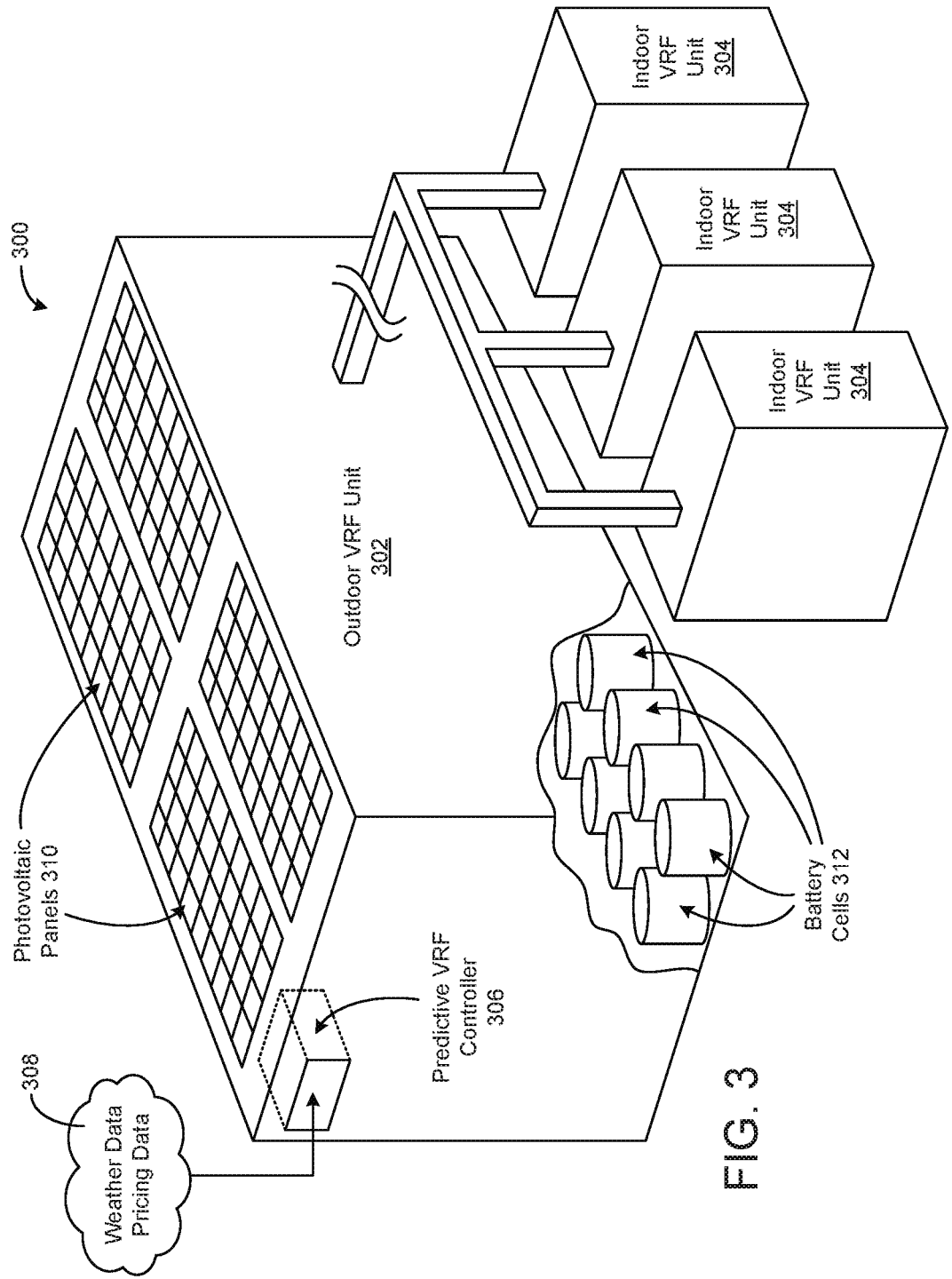
FIG. 3 is a drawing of a VRF system with a predictive VRF controller, according to an exemplary embodiment.

Referring now to FIG. 3, a variable refrigerant flow (VRF) system 300 with a predictive VRF controller 306 is shown, according to some embodiments. VRF system 300 is shown to include an outdoor VRF unit 302 and a plurality of indoor VRF units 304. Although only one outdoor VRF unit 302 and three indoor VRF units 304 are shown, it is contemplated that VRF system 300 can include any number of outdoor VRF units 302 and indoor VRF units 304. In some embodiments, VRF system 300 may include up to three outdoor VRF units 302 and up to 128 indoor VRF units 304.

VRF system 300 can be configured to provide heating and/or cooling to a building. For example, outdoor VRF unit 302 can be located outside the building (e.g., on a rooftop) and can operate to heat or cool a refrigerant. Outdoor VRF unit 302 may include one or more compressors, a fan, or other power-consuming refrigeration components configured to cycle a refrigerant between liquid, gas, and/or super-heated gas phases. Indoor VRF units 304 can be distributed throughout various building zones within a building and can receive the heated or cooled refrigerant from outdoor VRF unit 302. Each indoor VRF unit 304 can provide temperature control for the particular building zone in which the indoor VRF unit 304 is located.

In some embodiments, outdoor VRF unit 302 includes one or more photovoltaic (PV) panels 310. PV panels 310 may include a collection of photovoltaic cells. The photovoltaic cells are configured to convert solar energy (i.e., sunlight) into electricity using a photovoltaic material such as monocrystalline silicon, polycrystalline silicon, amorphous silicon, cadmium telluride, copper indium gallium selenide/sulfide, or other materials that exhibit the photovoltaic effect. In some embodiments, the photovoltaic cells are contained within packaged assemblies that form PV panels 310. Each PV panel 310 may include a plurality of linked photovoltaic cells. PV panels 310 may combine to form a photovoltaic array.

In some embodiments, PV panels 310 are configured to maximize solar energy collection. For example, outdoor VRF unit 302 may include a solar tracker (e.g., a GPS tracker, a sunlight sensor, etc.) that adjusts the angle of PV panels 310 so that PV panels 310 are aimed directly at the sun throughout the day. The solar tracker may allow PV panels 310 to receive direct sunlight for a greater portion of the day and may increase the total amount of power produced by PV panels 310. In some embodiments, outdoor VRF unit 302 includes a collection of mirrors, lenses, or solar concentrators configured to direct and/or concentrate sunlight on PV panels 310. The energy generated by PV panels 310 may be stored in battery cells 312 and/or used to power outdoor VRF unit 302.

In some embodiments, outdoor VRF unit 302 includes one or more battery cells 312. Battery cells 312 may form a battery 313 (shown in FIG. 4) configured to store and discharge electric energy (i.e., electricity). In some embodiments, battery 313 is charged using electricity from an external energy grid (e.g., provided by an electric utility). The electricity stored in battery 313 can be discharged to power one or more powered components of outdoor VRF unit 302 (e.g., a fan, a compressor, control valves, controller 306, etc.). Advantageously, battery 313 allows outdoor VRF unit 302 to draw electricity from the energy grid and charge battery 313 when energy prices are low and discharge the stored electricity when energy prices are high to time-shift the electric load of outdoor VRF unit 302. In some embodiments, battery 313 has sufficient energy capacity to power outdoor VRF unit 302 for approximately 4-6 hours when operating at maximum capacity such that battery 313 can be utilized during high energy cost periods and charged during low energy cost periods.

In some embodiments, predictive VRF controller 306 performs an optimization process to determine whether to charge or discharge battery 313 during each of a plurality of time steps that occur during an optimization period. Predictive VRF controller 306 may use weather and pricing data 308 to predict the amount of heating/cooling required and the cost of electricity during each of the plurality of time steps. Predictive VRF controller 306 can optimize an objective function that accounts for the cost of electricity purchased from the energy grid over the duration of the optimization period. In some embodiments, the objective function also accounts for the cost of heating or cooling the refrigerant within outdoor VRF unit 302. Predictive VRF controller 306 can determine an amount of electricity to purchase from the energy grid and an amount of electricity to store or discharge from battery 313 during each time step. The objective function and the optimization performed by predictive VRF controller 306 are described in greater detail with reference to FIGS. 5-6.

Figure 4:
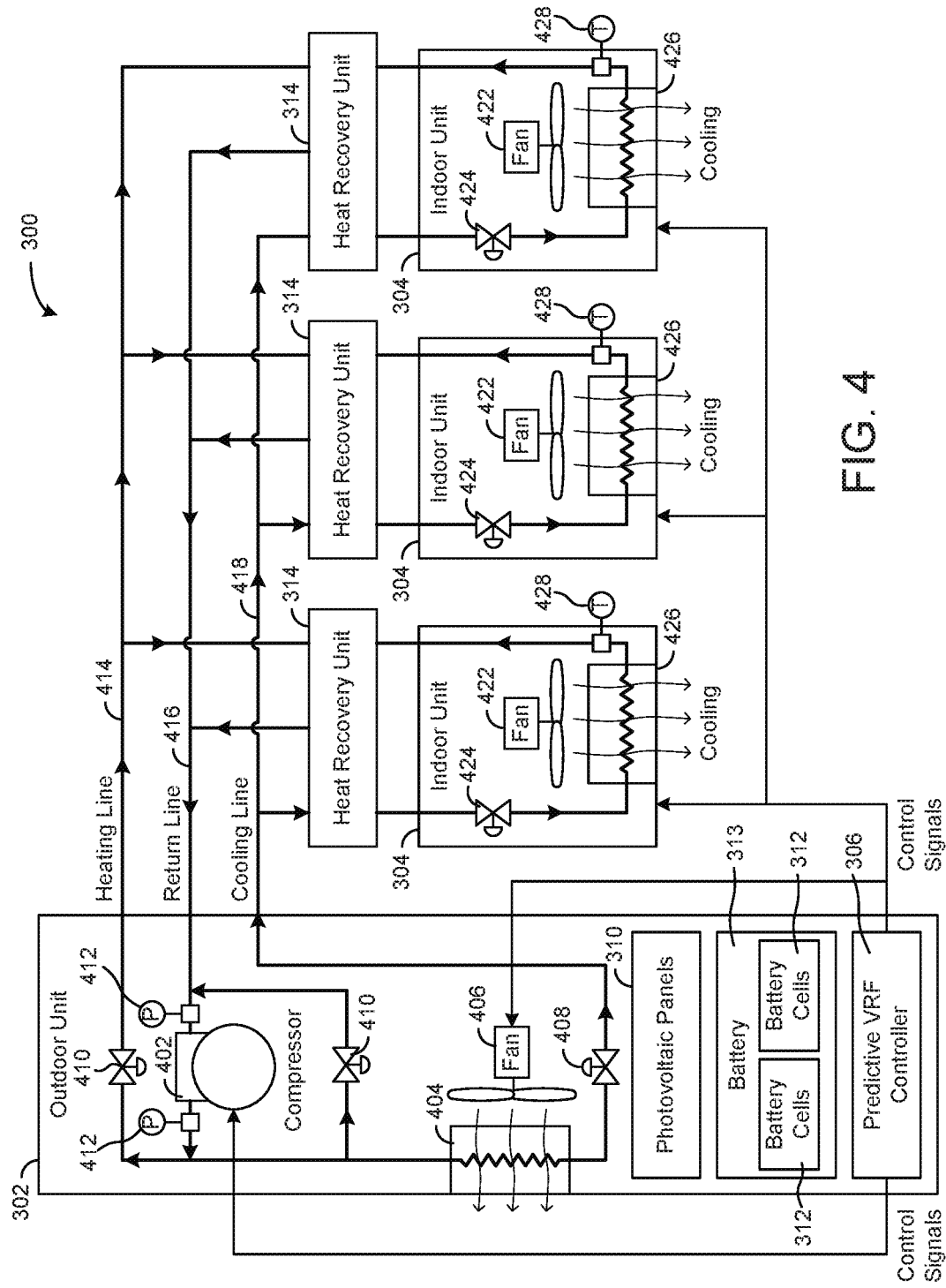
FIG. 4 is a block diagram illustrating the VRF system of FIG. 3 in greater detail, according to an exemplary embodiment.

Referring now to FIG. 4, a block diagram illustrating VRF system 300 in greater detail is shown, according to some embodiments. VRF system 300 is shown to include outdoor VRF unit 302, several heat recovery units 314, and several indoor VRF units 304. Outdoor VRF unit 302 may include a compressor 402, a fan 406, or other power-consuming refrigeration components configured convert a refrigerant between liquid, gas, and/or super-heated gas phases. Indoor VRF units 304 can be distributed throughout various building zones within a building and can receive the heated or cooled refrigerant from outdoor VRF unit 302. Each indoor VRF unit 304 can provide temperature control for the particular building zone in which the indoor VRF unit 304 is located. Heat recovery units 304 can control the flow of a refrigerant between outdoor VRF unit 302 and indoor VRF units 304 (e.g., by opening or closing valves) and can minimize the heating or cooling load to be served by outdoor VRF unit 302.

Outdoor VRF unit 302 is shown to include a compressor 402 and a heat exchanger 404. Compressor 402 circulates a refrigerant between heat exchanger 404 and indoor VRF units 304. Heat exchanger 404 can function as a condenser (allowing the refrigerant to reject heat to the outside air) when VRF system 300 operates in a cooling mode or as an evaporator (allowing the refrigerant to absorb heat from the outside air) when VRF system 300 operates in a heating mode. Fan 406 provides airflow through heat exchanger 404. The speed of fan 406 can be adjusted (e.g., by predictive VRF controller 306) to modulate the rate of heat transfer into or out of the refrigerant in heat exchanger 404.

Each indoor VRF unit 304 is shown to include a heat exchanger 426 and an expansion valve 424. Each of heat exchangers 426 can function as a condenser (allowing the refrigerant to reject heat to the air within the room or zone) when the indoor VRF unit 304 operates in a heating mode or as an evaporator (allowing the refrigerant to absorb heat from the air within the room or zone) when the indoor VRF unit 304 operates in a cooling mode. Fans 422 provide airflow through heat exchangers 426. The speeds of fans 422 can be adjusted (e.g., by predictive VRF controller 306) to modulate the rate of heat transfer into or out of the refrigerant in heat exchangers 426. Temperature sensors 428 can be used to measure the temperature of the refrigerant within indoor VRF units 304.

In FIG. 4, indoor VRF units 304 are shown operating in the cooling mode. In the cooling mode, the refrigerant is provided to indoor VRF units 304 via cooling line 418. The refrigerant is expanded by expansion valves 424 to a cold, low pressure state and flows through heat exchangers 426 (functioning as evaporators) to absorb heat from the room or zone within the building. The heated refrigerant then flows back to outdoor VRF unit 302 via return line 416 and is compressed by compressor 402 to a hot, high pressure state. The compressed refrigerant flows through heat exchanger 404 (functioning as a condenser) and rejects heat to the outside air. The cooled refrigerant can then be provided back to indoor VRF units 304 via cooling line 418. In the cooling mode, flow control valves 410 can be closed and expansion valve 408 can be completely open.

In the heating mode, the refrigerant is provided to indoor VRF units 304 in a hot state via heating line 414. The hot refrigerant flows through heat exchangers 426 (functioning as condensers) and rejects heat to the air within the room or zone of the building. The refrigerant then flows back to outdoor VRF unit via cooling line 418 (opposite the flow direction shown in FIG. 4). The refrigerant can be expanded by expansion valve 408 to a colder, lower pressure state. The expanded refrigerant flows through heat exchanger 404 (functioning as an evaporator) and absorbs heat from the outside air. The heated refrigerant can be compressed by compressor 402 and provided back to indoor VRF units 304 via heating line 414 in a hot, compressed state. In the heating mode, flow control valves 410 can be completely open to allow the refrigerant from compressor 402 to flow into heating line 414.

Predictive VRF controller 306 is shown providing control signals to compressor 402, fan 406, and indoor VRF units 304. The control signals provided to compressor 402 can include a compressor speed setpoint, a compressor power setpoint, a refrigerant flow setpoint, a refrigerant pressure setpoint (e.g., a differential pressure setpoint for the pressure measured by pressure sensors 412), on/off commands, staging commands, or other signals that affect the operation of compressor 402. Similarly, the control signals provided to fan 406 can include a fan speed setpoint, a fan power setpoint, an airflow setpoint, on/off commands, or other signals that affect the operation of fan 406. The control signals provided to indoor VRF units 304 can include temperature setpoints for the corresponding building zones, fan speed or airflow setpoints for fan 422, refrigerant flow setpoints, valve position setpoints for valves 424, or any other signals that affect the operation of indoor VRF units 304. In some embodiments, controller 306 provides control signals to valves 408-410 to modulate the positions of valves 408-410.

Predictive VRF Control System

Figure 5:
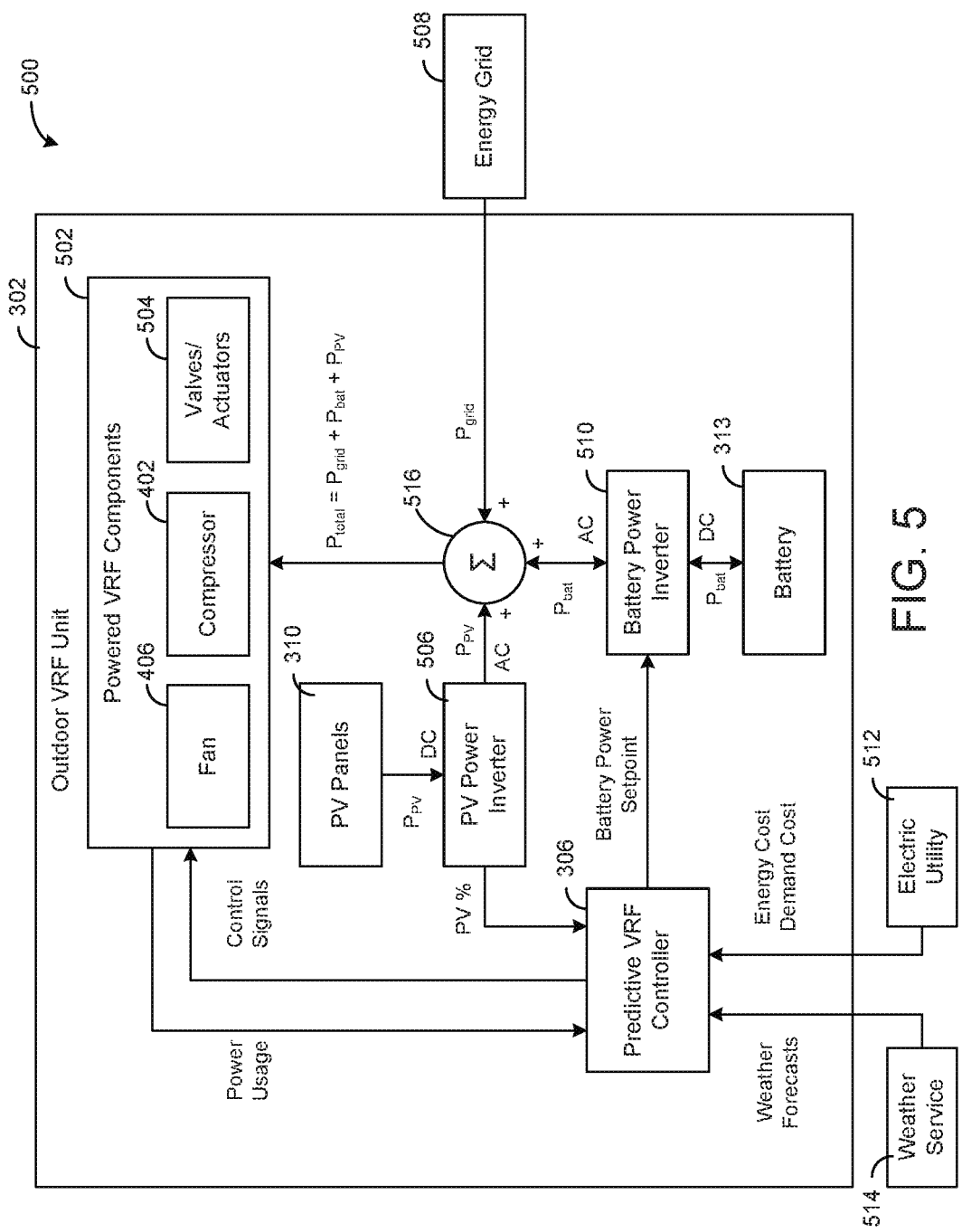
FIG. 5 is a block diagram of a predictive VRF control system including outdoor VRF unit of FIG. 3, according to an exemplary embodiment.

Referring now to FIG. 5, a block diagram of a predictive VRF control system 500 is shown, according to some embodiments. Several of the components shown in control system 500 may be part of outdoor VRF unit 302. For example, outdoor VRF unit 302 may include powered VRF components 502, battery 313, PV panels 310, predictive VRF controller 306, battery power inverter 510, PV power inverter 506, and a power junction 516. Powered VRF components 502 may include any component of outdoor VRF unit 302 that consumes power (e.g., electricity) during operation. For example, powered VRF components 502 are shown to include fan 406, compressor 402, and valves/actuators 504 (e.g., valves 408 and 410). In some embodiments, powered VRF components 502 include fans 422 and/or valves 424 within indoor VRF units 304.

Battery power inverter 510 and PV power inverter 506 may be configured to convert electric power between direct current (DC) and alternating current (AC). For example, battery 313 may be configured to store and output DC power, whereas energy grid 508 and powered VRF components 502 may be configured to consume and provide AC power. Battery power inverter 510 may be used to convert DC power from battery 313 into a sinusoidal AC output synchronized to the grid frequency of energy grid 508 and/or powered VRF components 502. Battery power inverter 510 may also be used to convert AC power from energy grid 508 into DC power that can be stored in battery 313. The power output of battery 313 is shown as $P_{bat}$. $P_{bat}$ may be positive if battery 313 is providing power to power inverter 510 (i.e., battery 313 is discharging) or negative if battery 313 is receiving power from power inverter 510 (i.e., battery 313 is charging).

Similarly, PV power inverter 506 can be configured to convert DC power from PV panels 310 into a sinusoidal AC output synchronized to the grid frequency of energy grid 508 and/or powered VRF components 502. The power output of PV panels 310 is shown as $P_{PV}$. The power output $P_{PV}$ of PV panels 310 can be stored in battery 313 and/or used to power powered VRF components 502. In some embodiments, PV power inverter 506 measures the amount of power $P_{PV}$ generated by PV panels 310 and provides an indication of the PV power to predictive VRF controller 306. For example, PV power inverter 506 is shown providing an indication of the PV power percentage (i.e., PV %) to VRF controller 306. The PV power percentage may represent a percentage of the maximum PV power at which PV panels 310 are currently operating.

In some embodiments, power inverters 510 and 506 are resonant inverters that include or use LC circuits to remove the harmonics from a simple square wave in order to achieve a sine wave matching the frequency of energy grid 508. In various embodiments, power inverters 510 and 506 may operate using high-frequency transformers, low-frequency transformers, or without transformers. Low-frequency transformers may convert the DC output from battery 313 or PV panels 310 directly to the AC output provided to powered VRF components 502. High-frequency transformers may employ a multi-step process that involves converting the DC output to high-frequency AC, then back to DC, and then finally to the AC output provided to powered VRF components 502.

Power junction 516 is the point at which powered VRF components 502, energy grid 508, battery power inverter 510, and PV power inverter 506 are electrically connected. The power supplied to power junction 516 from battery power inverter 510 is shown as $P_{bat}$. $P_{bat}$ may be positive if battery power inverter 510 is providing power to power junction 516 (i.e., battery 313 is discharging) or negative if battery power inverter 510 is receiving power from power junction 516 (i.e., battery 313 is charging). The power supplied to power junction 516 from PV power inverter 506 is shown as $P_{PV}$. The power supplied to power junction 516 from energy grid 508 is shown as $P_{grid}$.

$P_{bat}$, $P_{PV}$, and $P_{grid}$ combine at power junction 516 to form $P_{total}$ (i.e., $P_{total} = P_{grid} + P_{bat} + P_{PV}$). $P_{total}$ may be defined as the power provided to powered VRF components 502 from power junction 516. In some instances, $P_{total}$ is greater than $P_{grid}$. For example, when battery 313 is discharging, $P_{bat}$ may be positive which adds to the grid power $P_{grid}$ when $P_{bat}$ combines with $P_{grid}$ and $P_{PV}$ to form $P_{total}$. Similarly, when PV panels 310 are supplying power, $P_{PV}$ may be positive which adds to the grid power $P_{grid}$ when $P_{PV}$ combines with $P_{grid}$ and $P_{bat}$ to form $P_{total}$. In other instances, $P_{total}$ may be less than $P_{grid}$. For example, when battery 313 is charging, $P_{bat}$ may be negative which subtracts from the grid power $P_{grid}$ when $P_{bat}$ combines with $P_{grid}$ and $P_{PV}$ to form $P_{total}$.

Predictive VRF controller 306 can be configured to control powered VRF components 502 and power inverters 510, 506. In some embodiments, predictive VRF controller 306 generates and provides a battery power setpoint $P_{sp,bat}$ to power inverter 510. The battery power setpoint $P_{sp,bat}$ may include a positive or negative power value (e.g., kW) which causes power inverter 510 to charge battery 313 (when $P_{sp,bat}$ is negative) using power available at power junction 516 or discharge battery 313 (when $P_{sp,bat}$ is positive) to provide power to power junction 516 in order to achieve the battery power setpoint $P_{sp,bat}$.

In some embodiments, predictive VRF controller 306 generates and provides control signals to powered VRF components 502. Predictive VRF controller 306 may use a multi-stage optimization technique to generate the control signals. For example, predictive VRF controller 306 may include an economic controller configured to determine the optimal amount of power to be consumed by powered VRF components 502 at each time step during the optimization period. The optimal amount of power to be consumed may minimize a cost function that accounts for the cost of energy (e.g., electricity) consumed by outdoor VRF unit 302. The cost of energy may be based on time-varying energy prices from electric utility 512. In some embodiments, the cost function accounts for the cost of operating indoor VRF units 304. The cost of operating indoor VRF units 304 may include the cost of energy consumed by indoor VRF units 304 and/or the cost of generating the heated or chilled refrigerant supplied to indoor VRF units 304.

In some embodiments, predictive VRF controller 306 determines an optimal amount of power to purchase from energy grid 508 (i.e., a grid power setpoint $P_{sp,grid}$) and an optimal amount of power to store or discharge from battery 313 (i.e., a battery power setpoint $P_{sp,bat}$) at each of the plurality of time steps. Predictive VRF controller 306 may monitor the actual power usage of powered VRF components 502 and may utilize the actual power usage as a feedback signal when generating the optimal power setpoints.

Predictive VRF controller 306 may include a tracking controller configured to generate temperature setpoints that achieve the optimal amount of power consumption at each time step. The temperature setpoints can include, for example, a zone temperature setpoint $T_{sp,zone}$ for the building zones that contain indoor VRF units 304 and/or a supply air temperature setpoint $T_{sp,sa}$ for the airflow provided by indoor VRF units 304. In some embodiments, predictive VRF controller 306 uses equipment models for powered VRF components 502 to determine an amount of heating or cooling that can be generated by VRF components 502 based on the optimal amount of power consumption. Predictive VRF controller 306 can use a zone temperature model in combination with weather forecasts from a weather service 514 to predict how the temperature of the building zone $T_{zone}$ will change based on the power setpoints and/or the temperature setpoints.

In some embodiments, predictive VRF controller 306 uses the temperature setpoints to generate the control signals for powered VRF components 502 and/or indoor VRF units 304. The control signals may include on/off commands, speed setpoints for fan 406 and compressor 402, position setpoints for valves 408-410, speed setpoints for fans 422, position setpoints for valves 424, or other operating commands for individual devices of powered VRF components 502 or indoor VRF units 304. In other embodiments, the control signals may include the temperature setpoints (e.g., a zone temperature setpoint $T_{sp,zone}$, a supply air temperature setpoint $T_{sp,sa}$, etc.) generated by predictive VRF controller 306.

The temperature setpoints can be provided to powered VRF components 502, indoor VRF units 304, or local controllers for such devices which operate to achieve the temperature setpoints. For example, a local controller for one of indoor VRF units 304 may receive a measurement of the supply air temperature $T_{sa}$ from a supply air temperature sensor and/or a measurement the zone temperature $T_{zone}$ from a zone temperature sensor. The local controller can use a feedback control process (e.g., PID, ESC, MPC, etc.) to adjust the speed of fan 406 and/or compressor 402 to drive the measured temperature(s) to the temperature setpoint(s). Similar feedback control processes can be used to control fans 422 and/or valves 424 of indoor VRF units 304. The multi-stage optimization performed by predictive VRF controller 306 is described in greater detail with reference to FIG. 6.

Predictive VRF Controller

Figure 6:
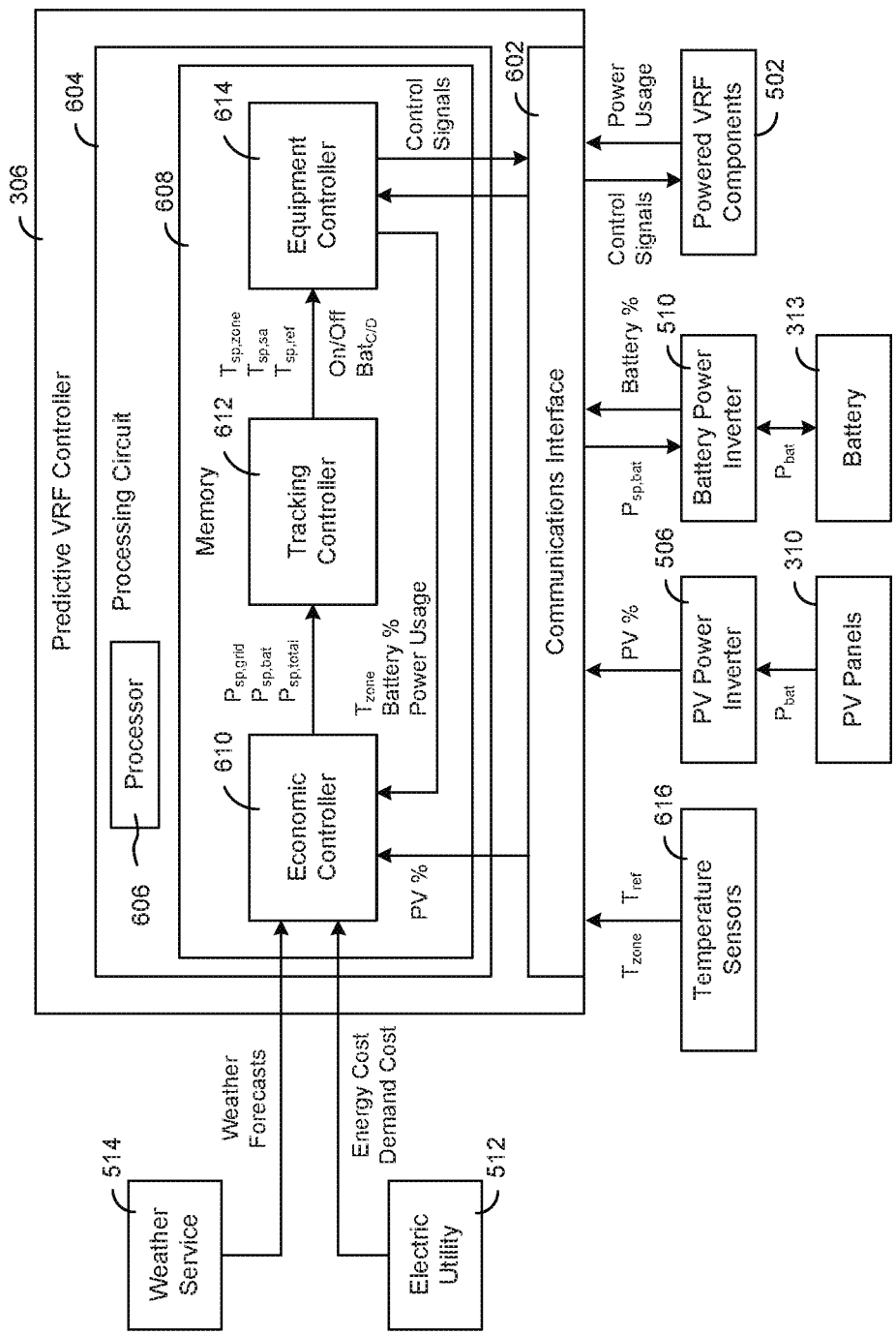
FIG. 6 is a block diagram illustrating a predictive VRF controller which can be used to monitor and control the VRF system of FIG. 3, according to an exemplary embodiment.

Referring now to FIG. 6, a block diagram illustrating predictive VRF controller 306 in greater detail is shown, according to an exemplary embodiment. Predictive VRF controller 306 is shown to include a communications interface 602 and a processing circuit 604. Communications interface 602 may facilitate communications between controller 306 and external systems or devices. For example, communications interface 602 may receive measurements of the zone temperature $T_{zone}$ and the refrigerant temperature $T_{ref}$ from temperature sensors 616 and measurements of the power usage of powered VRF components 502. In some embodiments, communications interface 602 receives measurements of the state-of-charge (SOC) of battery 313, which can be provided as a percentage of the maximum battery capacity (i.e., battery %). In some embodiments, communications interface 602 receives measurements of the amount of power $P_{PV}$ generated by PV panels 310, which can be provided as a percentage of the maximum PV capacity (i.e., PV %). Communications interface 602 can receive weather forecasts from a weather service 514 and predicted energy costs and demand costs from an electric utility 512. In some embodiments, predictive VRF controller 306 uses communications interface 602 to provide control signals powered VRF components 502 and power inverters 510, 506.

Communications interface 602 may include wired or wireless communications interfaces (e.g., jacks, antennas, transmitters, receivers, transceivers, wire terminals, etc.) for conducting data communications external systems or devices. In various embodiments, the communications may be direct (e.g., local wired or wireless communications) or via a communications network (e.g., a WAN, the Internet, a cellular network, etc.). For example, communications interface 602 can include an Ethernet card and port for sending and receiving data via an Ethernet-based communications link or network. In another example, communications interface 602 can include a WiFi transceiver for communicating via a wireless communications network or cellular or mobile phone communications transceivers.

Processing circuit 604 is shown to include a processor 606 and memory 608. Processor 606 may be a general purpose or specific purpose processor, an application specific integrated circuit (ASIC), one or more field programmable gate arrays (FPGAs), a group of processing components, or other suitable processing components. Processor 606 is configured to execute computer code or instructions stored in memory 608 or received from other computer readable media (e.g., CDROM, network storage, a remote server, etc.).

Memory 608 may include one or more devices (e.g., memory units, memory devices, storage devices, etc.) for storing data and/or computer code for completing and/or facilitating the various processes described in the present disclosure. Memory 608 may include random access memory (RAM), read-only memory (ROM), hard drive storage, temporary storage, non-volatile memory, flash memory, optical memory, or any other suitable memory for storing software objects and/or computer instructions. Memory 608 may include database components, object code components, script components, or any other type of information structure for supporting the various activities and information structures described in the present disclosure. Memory 608 may be communicably connected to processor 606 via processing circuit 604 and may include computer code for executing (e.g., by processor 606) one or more processes described herein. When processor 606 executes instructions stored in memory 608 for completing the various activities described herein, processor 606 generally configures controller 306 (and more particularly processing circuit 604) to complete such activities.

Still referring to FIG. 6, predictive VRF controller 306 is shown to include an economic controller 610, a tracking controller 612, and an equipment controller 614. Controllers 610-614 can be configured to perform a multi-state optimization process to generate control signals for power inverters 510, 506 and powered VRF components 502. In brief overview, economic controller 610 can optimize a predictive cost function to determine an optimal amount of power to purchase from energy grid 508 (i.e., a grid power setpoint $P_{sp,grid}$), an optimal amount of power to store or discharge from battery 313 (i.e., a battery power setpoint $P_{sp,bat}$), and/or an optimal amount of power to be consumed by powered VRF components 502 (i.e., a VRF power setpoint $P_{sp,total}$) at each time step of an optimization period. Tracking controller 612 can use the optimal power setpoints $P_{sp,grid}$, $P_{sp,bat}$, and/or $P_{sp,total}$ to determine optimal temperature setpoints (e.g., a zone temperature setpoint $T_{sp,zone}$, a supply air temperature setpoint $T_{sp,sa}$, a refrigerant temperature setpoint $T_{sp,ref}$, etc.) and an optimal battery charge or discharge rate (i.e., $Bat_{C/D}$). Equipment controller 614 can use the optimal temperature setpoints $T_{sp,zone}$ or $T_{sp,sa}$ to generate control signals for powered VRF components 502 that drive the actual (e.g., measured) temperatures $T_{zone}$ and/or $T_{sa}$ to the setpoints (e.g., using a feedback control technique). Each of controllers 610-614 is described in detail below.

Economic Controller

Economic controller 610 can be configured to optimize a predictive cost function to determine an optimal amount of power to purchase from energy grid 508 (i.e., a grid power setpoint $P_{sp,grid}$), an optimal amount of power to store or discharge from battery 313 (i.e., a battery power setpoint $P_{sp,bat}$), and/or an optimal amount of power to be consumed by powered VRF components 502 (i.e., a VRF power setpoint $P_{sp,total}$) at each time step of an optimization period. An example of a predictive cost function which can be optimized by economic controller 610 is shown in the following equation:

$$\min(J) = \sum_{k=1}^{h} C_{ec}(k) P_{comp}(k) \Delta t + \sum_{k=1}^{h} C_{ec}(k) P_{fan}(k) \Delta t + \sum_{k=1}^{h} C_{vrf}(k) F_{cold}(k) \Delta t + \sum_{k=1}^{h} C_{vrf}(k) F_{hot}(k) \Delta t + C_{DC} \max_{k}(P_{grid}(k)) - \sum_{k=1}^{h} C_{ec}(k) P_{bat}(k) \Delta t$$

where $C_{ec}(k)$ is the cost per unit of electricity (e.g., \$/kWh) purchased from electric utility 512 during time step k, $P_{comp}(k)$ is the power consumption (e.g., kW) of compressor 402 during time step k, $P_{fan}(k)$ is the power consumption (e.g., kW) of fan 406 during time step k, $C_{vrf}(k)$ is the cost incurred to heat or cool one unit of the refrigerant (e.g., \$/liter) provided to indoor VRF units 304 at time step k, $F_{cold}(k)$ is the flow rate of the chilled refrigerant provided to indoor VRF units 304 (e.g., liter/s) at time step k, $F_{hot}(k)$ is the flow rate of the heated refrigerant provided to indoor VRF units 304 (e.g., liter/s) at time step k, $C_{DC}$ is the demand charge rate (e.g., \$/kW), the max( ) term selects the maximum power consumption of VRF system 300 (i.e., the maximum value of $P_{grid}(k)$) during any time step k of the optimization period, $P_{bat}(k)$ is the amount of power discharged from battery 313 during time step k, and $\Delta t$ is the duration of each time step k. Economic controller 610 can optimize the predictive cost function J over the duration of the optimization period (e.g., from time step k=1 to time step k=h) to predict the total cost of operating VRF system 300 over the duration of the optimization period.

The first and second terms of the predictive cost function J represent the cost of electricity consumed by powered VRF components 502 over the duration of the optimization period. The values of the parameter $C_{ec}(k)$ at each time step k can be defined by the energy cost information provided by electric utility 512. In some embodiments, the cost of electricity varies as a function of time, which results in different values of $C_{ec}(k)$ at different time steps k. In some embodiments, the total power consumption $P_{total}(k)$ of powered VRF components 502 at time step k is a sum of the compressor power consumption $P_{comp}(k)$ and the fan power consumption $P_{fan}(k)$ (i.e., $P_{total}(k) = P_{fan}(k) + P_{comp}(k)$). The variables $P_{comp}(k)$ and $P_{fan}(k)$ are decision variables which can be optimized by economic controller 610.

The third and fourth terms of the predictive cost function J represent the cost of providing the heated refrigerant and the chilled refrigerant to indoor VRF units 304 over the duration of the optimization period. In some embodiments, the values of the parameter $C_{vrf}(k)$ are provided as inputs to predictive VRF controller 306. In other embodiments, the values of $C_{vrf}(k)$ can be determined by economic controller 610 based on attributes of the equipment used to generate the heated refrigerant and the chilled refrigerant provided to indoor VRF units 304. For example, if outdoor VRF units 302 are used to generate the heated/chilled refrigerant, a performance curve for outdoor VRF units 302 can be used to model the performance of outdoor VRF units 302. In some embodiments, the performance curve defines the relationship between input resources and output resources of outdoor VRF units 302. For example, the performance curve for outdoor VRD units 302 may define the electricity consumption (e.g., kW) of outdoor VRF units 302 as a function of the amount chilled/heated refrigerant produced by outdoor VRF units 302 (e.g., liters/s). Economic controller 610 can use the performance curve for outdoor VRF units 302 to determine an amount of electricity consumption that corresponds to a given amount of refrigerant production. Several examples of subplant curves which can be used by economic controller 610 are described in greater detail in U.S. patent application Ser. No. 14/634,609 filed Feb. 27, 2015, the entire disclosure of which is incorporated by reference herein.

Economic controller 610 can use the performance curve for outdoor VRF units 302 in combination with the energy prices from electric utility 512 to determine a value for the parameter $C_{vrf}(k)$. For example, the following equation can be used by economic controller 610 to determine the value of parameter $C_{vrf}(k)$ for a given flow rate $F_{cold}(k)$ of the chilled refrigerant:

$$C_{vrf}(k)\left[\frac{\$}{\text{liter}}\right] = \theta_{outdoor}(F_{cold}(k))\left[\frac{\text{kW}}{\text{liter/s}}\right] * C_{ec}(k)\left[\frac{\$}{\text{kWh}}\right]$$

where $\theta_{outdoor}(k)$ is the slope of the performance curve for outdoor VRF units 302 at the specified refrigerant flow rate $F_{cold}(k)$ and $C_{ec}(k)$ is the cost of electricity at time step k.

The slope $\theta_{outdoor}$ represents the amount of electric power (i.e., kW electricity) required to produce the corresponding amount of chilled refrigerant (i.e., liters/s). The cost of electricity $C_{ec}(k)$ can be defined by the energy cost information received from electric utility 512, whereas the slope of the performance curve $\theta_{outdoor}(F_{cold}(k))$ can be defined by the performance curve for outdoor VRF units 302 as a function of the specified refrigerant flow rate $F_{cold}(k)$.

Similarly, the following equation can be used by economic controller 610 to determine the value of parameter $C_{vrf}(k)$ for a given flow rate $F_{hot}(k)$ of the heated refrigerant:

$$C_{vrf}(k)\left[\frac{\$}{\text{liter}}\right] = \theta_{outdoor}(F_{hot}(k))\left[\frac{kW}{\text{liter/s}}\right] * C_{ec}(k)\left[\frac{\$}{kWh}\right]$$

where $\theta_{outdoor}(k)$ is the slope of the performance curve for outdoor VRF units 302 at the specified refrigerant flow rate $F_{hot}(k)$ and $C_{ec}(k)$ is the cost of electricity at time step k. The slope $\theta_{outdoor}$ represents the amount of electric power (i.e., kW electricity) required to produce the corresponding amount of heated refrigerant (i.e., liters/s). The cost of electricity $C_{ec}(k)$ can be defined by the energy cost information received from electric utility 512, whereas the slope of the performance curve $\theta_{outdoor}(F_{hot}(k))$ can be defined by the performance curve for outdoor VRF units 302 as a function of the specified refrigerant flow rate $F_{hot}(k)$. The variables $F_{cold}(k)$ and $F_{hot}(k)$ are decision variables which can be optimized by economic controller 610.

The fifth term of the predictive cost function J represents the demand charge. Demand charge is an additional charge imposed by some utility providers based on the maximum power consumption during an applicable demand charge period. For example, the demand charge rate $C_{DC}$ may be specified in terms of dollars per unit of power (e.g., $/kW) and may be multiplied by the peak power usage (e.g., kW) during a demand charge period to calculate the demand charge. In the predictive cost function J, the demand charge rate $C_{DC}$ may be defined by the demand cost information received from electric utility 512. The variable $P_{grid}(k)$ is a decision variable which can be optimized by economic controller 610 in order to reduce the peak power usage $\max(P_{grid}(k))$ that occurs during the demand charge period. Load shifting may allow economic controller 610 to smooth momentary spikes in the electric demand of VRF system 300 by storing energy in battery 313 when the power consumption of powered VRF components 502 is low. The stored energy can be discharged from battery 313 when the power consumption of powered VRF components 502 is high in order to reduce the peak power draw $P_{grid}$ from energy grid 508, thereby decreasing the demand charge incurred.

The final term of the predictive cost function J represents the cost savings resulting from the use of battery 313. Unlike the previous terms in the cost function J, the final term subtracts from the total cost. The values of the parameter $C_{ec}(k)$ at each time step k can be defined by the energy cost information provided by electric utility 512. In some embodiments, the cost of electricity varies as a function of time, which results in different values of $C_{ec}(k)$ at different time steps k. The variable $P_{bat}(k)$ is a decision variable which can be optimized by economic controller 610. A positive value of $P_{bat}(k)$ indicates that battery 313 is discharging, whereas a negative value of $P_{bat}(k)$ indicates that battery 313 is charging. The power discharged from battery 313 $P_{bat}(k)$ can be used to satisfy some or all of the total power consumption $P_{total}(k)$ of powered VRF components 502, which reduces the amount of power $P_{grid}(k)$ purchased from energy grid 508 (i.e., $P_{grid}(k)=P_{total}(k)-P_{bat}(k)-P_{PV}(k)$). However, charging battery 313 results in a negative value of $P_{bat}(k)$ which adds to the total amount of power $P_{grid}(k)$ purchased from energy grid 508.

In some embodiments, the power $P_{PV}$ provided by PV panels 310 is not included in the predictive cost function J because generating PV power does not incur a cost. However, the power $P_{PV}$ generated by PV panels 310 can be used to satisfy some or all of the total power consumption $P_{total}(k)$ of powered VRF components 502, which reduces the amount of power $P_{grid}(k)$ purchased from energy grid 508 (i.e., $P_{grid}(k)=P_{total}(k)-P_{bat}(k)-P_{PV}(k)$). The amount of PV power $P_{PV}$ generated during any time step k can be predicted by economic controller 610. Several techniques for predicting the amount of PV power generated by PV panels are described in U.S. patent application Ser. No. 15/247,869, U.S. patent application Ser. No. 15/247,844, and U.S. patent application Ser. No. 15/247,788. Each of these patent applications has a filing date of Aug. 25, 2016, and the entire disclosure of each of these patent applications is incorporated by reference herein.

Economic controller 610 can optimize the predictive cost function J over the duration of the optimization period to determine optimal values of the decision variables at each time step during the optimization period. In some embodiments, the optimization period has a duration of approximately one day and each time step is approximately fifteen minutes. However, the durations of the optimization period and the time steps can vary in other embodiments and can be adjusted by a user. Advantageously, economic controller 610 can use battery 313 to perform load shifting by drawing electricity from energy grid 508 when energy prices are low and/or when the power consumed by powered VRF components 502 is low. The electricity can be stored in battery 313 and discharged later when energy prices are high and/or the power consumption of powered VRF components 502 is high. This enables economic controller 610 to reduce the cost of electricity consumed by VRF system 300 and can smooth momentary spikes in the electric demand of VRF system 300, thereby reducing the demand charge incurred.

Economic controller 610 can be configured to impose constraints on the optimization of the predictive cost function J. In some embodiments, the constraints include constraints on the temperature $T_{zone}$ of each building zone heated or cooled by VRF system 300. Economic controller 610 can be configured to maintain the actual or predicted temperature $T_{zone}$ between an minimum temperature bound $T_{min}$ and a maximum temperature bound $T_{max}$ (i.e., $T_{min} \leq T_{zone} \leq T_{max}$) at all times. The parameters $T_{min}$ and $T_{max}$ may be time-varying to define different temperature ranges at different times (e.g., an occupied temperature range, an unoccupied temperature range, a daytime temperature range, a nighttime temperature range, etc.).

In order to ensure that the zone temperature constraint is satisfied, economic controller 610 can model the temperature $T_{zone}$ of the building zone as a function of the decision variables optimized by economic controller 610. In some embodiments, economic controller 610 models the temperature of the building zone using a heat transfer model. For example, the dynamics of heating or cooling the building zone can be described by the energy balance:

$$C\frac{dT_{zone}}{dt} = -H(T_{zone} - T_a) + \dot{Q}_{HVAC} + \dot{Q}_{other}$$

where C is the thermal capacitance of the building zone, H is the ambient heat transfer coefficient for the building zone, $T_{zone}$ is the temperature of the building zone, $T_a$ is the ambient temperature outside the building zone (e.g., the outside air temperature). $\dot{Q}_{HVAC}$ is the amount of heating applied to the building zone by VRF system 300, and $\dot{Q}_{other}$ is the external load, radiation, or other disturbance experienced by the building zone. In the previous equation, $\dot{Q}_{HVAC}$ represents heat transfer into the building zone by VRF system 300 (i.e., the heating load) and therefore has a positive sign. However, if cooling is applied to the building zone rather than heating, the sign on $\dot{Q}_{HVAC}$ can be switched to a negative sign such that $\dot{Q}_{HVAC}$ represents the amount of cooling applied to the building zone by VRF system 300 (i.e., the cooling load).

In some embodiments, the amount of heating or cooling $\dot{Q}_{HVAC}$ provided by VRF system 300 can be defined as a function of the decision variables $P_{comp}$, $P_{fan}$, $F_{cold}$, $F_{hot}$, and $P_{bat}$. Several techniques for developing zone temperature models and relating the zone temperature $T_{zone}$ to the decision variables in the predictive cost function J are described in greater detail in U.S. Pat. No. 9,436,179 granted Sep. 6, 2016, U.S. patent application Ser. No. 14/694,633 filed Apr. 23, 2015, and U.S. patent application Ser. No. 15/199,510 filed Jun. 30, 2016. The entire disclosure of each of these patents and patent applications is incorporated by reference herein.

The previous energy balance combines all mass and air properties of the building zone into a single zone temperature. Other heat transfer models which can be used by economic controller 610 include the following air and mass zone models:

$$C_z \frac{dT_{zone}}{dt} = H_{az}(T_a - T_{zone}) + H_{mz}(T_m - T_{zone}) + \dot{Q}_{HVAC} + \dot{Q}_{other}$$

$$C_m \frac{dT_m}{dt} = H_{mz}(T_{zone} - T_m)$$

where $C_z$ and $T_{zone}$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_m$ and $T_m$ are the thermal capacitance and temperature of the non-air mass within the building zone, and $H_{mz}$ is the heat transfer coefficient between the air of the building zone and the non-air mass.

The previous equation combines all mass properties of the building zone into a single zone mass. Other heat transfer models which can be used by economic controller 610 include the following air, shallow mass, and deep mass zone models:

$$C_z \frac{dT_{zone}}{dt} = H_{az}(T_a - T_{zone}) + H_{sz}(T_s - T_{zone}) + \dot{Q}_{HVAC} + \dot{Q}_{other}$$

$$C_s \frac{dT_s}{dt} = H_{sz}(T_{zone} - T_s) + H_{ds}(T_d - T_s)$$

$$C_d \frac{dT_d}{dt} = H_{ds}(T_s - T_d)$$

where $C_z$ and $T_{zone}$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_s$ and $T_s$ are the thermal capacitance and temperature of the shallow mass within the building zone, $H_{sz}$ is the heat transfer coefficient between the air of the building zone and the shallow mass, $C_d$ and $T_d$ are the thermal capacitance and temperature of the deep mass within the building zone, and $H_{ds}$ is the heat transfer coefficient between the shallow mass and the deep mass.

In some embodiments, economic controller 610 uses the weather forecasts from weather service 514 to determine appropriate values for the ambient air temperature $T_a$ and/or the external disturbance $\dot{Q}_{other}$ at each time step of the optimization period. Values of C and H can be specified as parameters of the building zone, received from tracking controller 612, received from a user, retrieved from memory 608, or otherwise provided as an input to economic controller 610. Accordingly, the temperature of the building zone $T_{zone}$ can be defined as a function of the amount of heating or cooling $\dot{Q}_{HVAC}$ applied to the building zone by VRF system 300 using any of these heat transfer models. The manipulated variable $\dot{Q}_{HVAC}$ can be adjusted by economic controller 610 by adjusting the variables $P_{fan}$, $P_{comp}$, $F_{cold}$, and $F_{hot}$ in the predictive cost function J.

In some embodiments, economic controller 610 uses a model that defines the amount of heating or cooling $\dot{Q}_{HVAC}$ applied to the building zone by VRF system 300 as a function of the power setpoints $P_{sp,grid}$ and $P_{sp,bat}$ provided by economic controller 610. For example, economic controller 610 can add the power setpoints $P_{sp,grid}$ and $P_{sp,bat}$ to determine the total amount of power $P_{total}$ that will be consumed by powered VRF components 502. In some embodiments, $P_{total}$ is equivalent to the combined power consumption of fan 406 and compressor 402 (i.e., $P_{total}=P_{fan}+P_{comp}$) and can be used by economic controller 610 to determine the amount of heating or cooling provided to the refrigerant by outdoor VRF units 302. Similarly, $F_{hot}$ and $F_{cold}$ can be used to determine the amount of heating or cooling provided to each building zone by indoor VRF units 304. Economic controller 610 can use $P_{total}$ in combination with $F_{cold}$ and $F_{hot}$ to determine the total amount of heating or cooling $\dot{Q}_{HVAC}$ applied to each building zone by VRF system 300.

In some embodiments, economic controller 610 uses one or more models that define the amount of heating or cooling applied to the building zone by VRF system 300 (i.e., $\dot{Q}_{HVAC}$) as a function of the zone temperature $T_{zone}$ and the zone temperature setpoint $T_{sp,zone}$ as shown in the following equation:

$$\dot{Q}_{HVAC}=f(T_{zone},T_{sp,zone})$$

The models used by economic controller 610 can be imposed as optimization constraints to ensure that the amount of heating or cooling $\dot{Q}_{HVAC}$ provided by VRF system 300 is not reduced to a value that would cause the zone temperature $T_{zone}$ to deviate from an acceptable or comfortable temperature range.

In some embodiments, economic controller 610 relates the amount of heating or cooling $\dot{Q}_{HVAC}$ provided by VRF system 300 to the zone temperature $T_{zone}$ and the zone temperature setpoint $T_{sp,zone}$ using multiple models. For example, economic controller 610 can use a model of equipment controller 614 to determine the control action performed by equipment controller 614 as a function of the zone temperature $T_{zone}$ and the zone temperature setpoint $T_{sp,zone}$. An example of such a zone regulatory controller model is shown in the following equation:

$$v_{air}=f_1(T_{zone},T_{sp,zone})$$

where $v_{air}$ is the rate of airflow to the building zone (i.e., the control action). In some embodiments, $v_{air}$ depends on the speed of fans 422 in indoor VRF units 304. Economic controller 610 can use an equipment model or manufacturer specifications for fans 422 to define $v_{air}$ as a function of $T_{zone}$ and $T_{sp,zone}$. The function $f_1$ can be identified from data. For example, economic controller 610 can collect measurements of $v_{air}$ and $T_{zone}$ and identify the corresponding value of $T_{sp,zone}$. Economic controller 610 can perform a system identification process using the collected values of Pair, $T_{zone}$, and $T_{sp,zone}$ as training data to determine the function $f_1$ that defines the relationship between such variables.

Economic controller 610 can use an energy balance model relating the control action $v_{air}$ to the amount of heating or cooling $\dot{Q}_{HVAC}$ provided by VRF system 300 as shown in the following equation:

$$\dot{Q}_{HVAC} = f_2(v_{air})$$

where the function $f_2$ can be identified from training data. Economic controller 610 can perform a system identification process using collected values of $v_{air}$ and $\dot{Q}_{HVAC}$ to determine the function $f_2$ that defines the relationship between such variables.

In some embodiments, a linear relationship exists between $\dot{Q}_{HVAC}$ and $v_{air}$. Assuming an ideal proportional-integral (PI) controller and a linear relationship between $\dot{Q}_{HVAC}$ and $v_{air}$, a simplified linear controller model can be used to define the amount of heating or cooling $\dot{Q}_{HVAC}$ provided by VRF system 300 as a function of the zone temperature $T_{zone}$ and the zone temperature setpoint $T_{sp,zone}$. An example of such a model is shown in the following equations:

$$\dot{Q}_{HVAC} = \dot{Q}_{ss} + K_c \left[ \varepsilon + \frac{1}{\tau_I} \int_0^t \varepsilon(t') dt' \right]$$

$$\varepsilon = T_{sp,zone} - T_{zone}$$

where $\dot{Q}_{ss}$ is the steady-state rate of heating or cooling rate, $K_c$ is the scaled zone PI controller proportional gain, $\tau_1$ is the zone PI controller integral time, and $\varepsilon$ is the setpoint error (i.e., the difference between the zone temperature setpoint $T_{sp,zone}$ and the zone temperature $T_{zone}$). Saturation can be represented by constraints on $\dot{Q}_{HVAC}$. If a linear model is not sufficiently accurate to model equipment controller 614 and heat transfer in indoor VRF units 304, a nonlinear heating/cooling duty model can be used instead.

In addition to constraints on the zone temperature $T_{zone}$, economic controller 610 can impose constraints on the state-of-charge (SOC) and charge/discharge rates of battery 313. In some embodiments, economic controller 610 generates and imposes the following power constraints on the predictive cost function J:

$$P_{bat} \leq P_{rated}$$

$$-P_{bat} \leq P_{rated}$$

where $P_{bat}$ is the amount of power discharged from battery 313 and $P_{rated}$ is the rated battery power of battery 313 (e.g., the maximum rate at which battery 313 can be charged or discharged). These power constraints ensure that battery 313 is not charged or discharged at a rate that exceeds the maximum possible battery charge/discharge rate $P_{rated}$.

In some embodiments, economic controller 610 generates and imposes one or more capacity constraints on the predictive cost function J The capacity constraints may be used to relate the battery power $P_{bat}$ charged or discharged during each time step to the capacity and SOC of battery 313. The capacity constraints may ensure that the capacity of battery 313 is maintained within acceptable lower and upper bounds at each time step of the optimization period. In some embodiments, economic controller 610 generates the following capacity constraints:

$$C_a(k) - P_{bat}(k) \Delta t \leq C_{rated}$$

$$C_a(k) - P_{bat}(k) \Delta t \geq 0$$

where $C_a(k)$ is the available battery capacity (e.g., kWh) at the beginning of time step k, $P_{bat}(k)$ is the rate at which battery 313 is discharged during time step k (e.g., kW), $\Delta t$ is the duration of each time step, and $C_{rated}$ is the maximum rated capacity of battery 313 (e.g., kWh). The term $P_{bat}(k)\Delta t$ represents the change in battery capacity during time step k. These capacity constraints ensure that the capacity of battery 313 is maintained between zero and the maximum rated capacity $C_{rated}$.

In some embodiments, economic controller 610 generates and imposes one or more capacity constraints on the operation of powered VRF components 502. For example, fan 406 may have a maximum operating speed which corresponds to a maximum power consumption $P_{fan,max}$ by fan 406. Similarly, compressor 402 may have a maximum operating speed which corresponds to a maximum power consumption $P_{comp,max}$ by compressor 402. Economic controller 610 can be configured to generate constraints which limit the power consumption of fan 406 and compressor 402 between zero and the maximum values, as shown in the following equations:

$$0 \leq P_{fan} \leq P_{fan,max}$$

$$0 \leq P_{comp} \leq P_{comp,max}$$

Economic controller 610 may also establish constraints that define the total power consumption of powered VRF components 502, as shown in the following equations:

$$P_{total} = P_{fan} + P_{comp}$$

$$P_{total} = P_{sp,grid} + P_{sp,bat} + P_{PV}$$

where the total power $P_{total}$ provided to powered VRF components 502 is the sum of the grid power setpoint $P_{sp,grid}$, the battery power setpoint $P_{sp,bat}$, and the PV power $P_{PV}$. The total power consumption $P_{total}$ of VRF components 502 is also a sum of the fan power consumption $P_{fan}$ and the compressor power consumption $P_{comp}$.

In some embodiments, economic controller 610 generates and imposes one or more capacity constraints on the operation of outdoor VRF units 302. For example, the operation of outdoor VRF units 302 may be defined by an equipment performance curve for outdoor VRF units 302. The equipment performance curve may define the amount of heating or cooling provided by outdoor VRF units 302 as a function of the electricity consumed by outdoor VRF units 302. Economic controller 610 can generate and impose a constraint that limits the operation of outdoor VRF units 302 to a point on the equipment performance curve. Several examples of equipment performance curves which can be used by economic controller 610 are described in greater detail in U.S. patent application Ser. No. 14/634,609 filed Feb. 27, 2015.

In some embodiments, economic controller 610 can generate and impose a constraint that limits the flow rate of the refrigerant through indoor VRF units 304 between zero and a maximum flow rate $F_{max}$. An example of such a constraint is shown in the following equation:

$$0 \leq F_{cold} \leq F_{max}$$

$$0 \leq F_{hot} \leq F_{max}$$

Economic controller 610 can optimize the predictive cost function J subject to the constraints to determine optimal values for the decision variables $P_{fan}$, $P_{comp}$, $F_{cold}$, $F_{hot}$, $P_{grid}$, and $P_{bat}$, where $P_{total} = P_{bat} + P_{grid} + P_{PV}$. In some embodiments, economic controller 610 uses the optimal values for $P_{total}$, $P_{bat}$, and/or $P_{grid}$ to generate power setpoints for tracking controller 612. The power setpoints can include battery power setpoints $P_{sp,bat}$, grid power setpoints $P_{sp,grid}$, and/or VRF power setpoints $P_{sp,total}$ for each of the time steps k in the optimization period. Economic controller 610 can provide the power setpoints to tracking controller 612.

Tracking Controller

Tracking controller 612 can use the optimal power setpoints $P_{sp,grid}$, $P_{sp,bat}$, and/or $P_{sp,total}$ generated by economic controller 610 to determine optimal temperature setpoints (e.g., a zone temperature setpoint $T_{sp,zone}$, a supply air temperature setpoint $T_{sp,sa}$, a refrigerant temperature setpoint $T_{sp,ref}$, etc.) and an optimal battery charge or discharge rate (i.e., $Bat_{C/D}$). In some embodiments, tracking controller 612 generates a zone temperature setpoint $T_{sp,zone}$, a supply air temperature setpoint $T_{sp,sa}$, and/or a refrigerant temperature setpoint $T_{sp,ref}$ that are predicted to achieve the power setpoint $P_{sp,total}$ for VRF system 300. In other words, tracking controller 612 may generate a zone temperature setpoint $T_{sp,zone}$, a supply air temperature setpoint $T_{sp,sa}$, and/or a refrigerant temperature setpoint $T_{sp,ref}$ that cause VRF system 300 to consume the optimal amount of power $P_{total}$ determined by economic controller 610.

In some embodiments, tracking controller 612 relates the power consumption of VRF system 300 to the zone temperature $T_{zone}$ and the zone temperature setpoint $T_{sp,zone}$ using a power consumption model. For example, tracking controller 612 can use a model of equipment controller 614 to determine the control actions performed by equipment controller 614 as a function of the zone temperature $T_{zone}$ and the zone temperature setpoint $T_{sp,zone}$. An example of such a zone regulatory controller model is shown in the following equation:

$$s_{sp,comp} = f_3(T_{zone}, T_{sp,zone})$$

$$s_{sp,fan} = f_4(T_{zone}, T_{sp,zone})$$

where $s_{sp,comp}$ is the speed setpoint for compressor 402 and $s_{sp,fan}$ is the speed setpoint for fan 406.

In some embodiments, $s_{sp,comp}$ and $s_{sp,fan}$ have corresponding power consumption values, $P_{comp}$ and $P_{fan}$, respectively. Tracking controller 612 can use an equipment model or manufacturer specifications for compressor 402 and fan 406 to translate $s_{sp,comp}$ and $s_{sp,fan}$ into corresponding power consumption values $P_{comp}$ and $P_{fan}$. Accordingly, tracking controller 612 can define the power consumption $P_{total} = P_{comp} + P_{fan}$ as a function of the zone temperature $T_{zone}$ and the zone temperature setpoint $T_{sp,zone}$. An example of such a model is shown in the following equation:

$$P_{total} = f_4(T_{zone}, T_{sp,zone})$$

The function $f_4$ can be identified from data. For example, tracking controller 612 can collect measurements of $P_{total}$ and $T_{zone}$ and identify the corresponding value of $T_{sp,zone}$. Tracking controller 612 can perform a system identification process using the collected values of $P_{total}$, $T_{zone}$, and $T_{sp,zone}$ as training data to determine the function $f_4$ that defines the relationship between such variables.

Tracking controller 612 may use a similar model to determine the relationship between the total power consumption $P_{total}$ of VRF system 300 and the supply air temperature setpoint $T_{sp,sa}$. For example, tracking controller 612 can define the power consumption $P_{total}$ as a function of the zone temperature $T_{zone}$ and the supply air temperature setpoint $T_{sp,zone}$. An example of such a model is shown in the following equation:

$$P_{total} = f_5(T_{zone}, T_{sp,sa})$$

The function $f_5$ can be identified from data. For example, tracking controller 612 can collect measurements of $P_{total}$ and $T_{zone}$ and identify the corresponding value of $T_{sp,sa}$. Tracking controller 612 can perform a system identification process using the collected values of $P_{total}$, $T_{zone}$, and $T_{sp,sa}$ as training data to determine the function $f_5$ that defines the relationship between such variables.

Tracking controller 612 can use the relationships between $P_{total}$, $T_{sp,zone}$, and $T_{sp,sa}$ to determine values for $T_{sp,zone}$ and $T_{sp,sa}$. For example, tracking controller 612 can receive the value of $P_{total}$ as an input from economic controller 610 (i.e., $P_{sp,total}$) and can use determine corresponding values of $T_{sp,zone}$ and $T_{sp,sa}$. In some embodiments, the temperature setpoints are zone-specific. A first set of indoor VRF units 304 may receive a first temperature setpoint, whereas a second set of indoor VRF units 304 may receive a second temperature setpoint. Tracking controller 612 can provide the values of $T_{sp,zone}$ and $T_{sp,sa}$ as outputs to equipment controller 614.

In some embodiments, tracking controller 612 generates zone-specific temperature setpoints $T_{sp,zone}$ and $T_{sp,sa}$ that cause some of indoor VRF units 304 to operate in a heating mode while other indoor VRF units 304 operate in a cooling mode. Advantageously, operating indoor VRF units 304 in both heating and cooling simultaneously allows the heat extracted from one building zone to be used to heat another building zone. This reduces the total heating or cooling load on outdoor VRF units 302 and consequently reduces the total power consumption of outdoor VRF units 302. In some embodiments, tracking controller 612 forces some of indoor VRF units 304 into heating or cooling at times when heating or cooling is not required for the corresponding building zones in order to counterbalance the heating or cooling provided to other building zones. This type of control action effectively transfers heat from one building zone to another without requiring outdoor VRF units 302 to provide additional heating or cooling. By adjusting the temperature setpoints in this manner, tracking controller 612 can minimize the power consumption of VRF system 300 while maintaining the temperature of each building zone within an acceptable temperature range (e.g., $T_{min} \leq T_{zone} \leq T_{max}$).

In some embodiments, tracking controller 612 uses the battery power setpoint $P_{sp,bat}$ to determine the optimal rate $Bat_{C/D}$ at which to charge or discharge battery 313. For example, the battery power setpoint $P_{sp,bat}$ may define a power value (kW) which can be translated by tracking controller 612 into a control signal for power inverter 510 and/or equipment controller 614. In other embodiments, the battery power setpoint $P_{sp,bat}$ is provided directly to power inverter 510 and used by power inverter 510 to control the battery power $P_{bat}$.

Equipment Controller

Equipment controller 614 can use the optimal temperature setpoints $T_{sp,zone}$, $T_{sp,sa}$, and/or $T_{sp,ref}$ generated by tracking controller 612 to generate control signals for powered VRF components 502. The control signals generated by equipment controller 614 may drive the actual (e.g., measured) temperatures $T_{zone}$, $T_{sa}$, and/or $T_{ref}$ to the setpoints. Equipment controller 614 can use any of a variety of control techniques to generate control signals for powered VRF components 502. For example, equipment controller 614 can use state-based algorithms, extremum seeking control (ESC) algorithms, proportional-integral (PI) control algorithms, proportional-integral-derivative (PID) control algorithms, model predictive control (MPC) algorithms, or other feedback control algorithms, to generate control signals for powered VRF components 502.

The control signals may include on/off commands, speed setpoints for fans 406 and 422, position setpoints for valves/actuators 504, or other operating commands for individual devices of powered VRF components 502. In some embodiments, equipment controller 614 uses a feedback control technique (e.g., PID, ESC, MPC, etc.) to adjust the speed of fan 406 and/or compressor 402 to adjust the amount of heating or cooling applied to the refrigerant to drive the measured refrigerant temperature $T_{ref}$ to the refrigerant temperature setpoint $T_{sp,ref}$. Similarly, equipment controller 614 can use a feedback control technique to control the positions of valves 424 and the speeds of fans 422 to adjust the refrigerant flow rates and airflow rates through indoor VRF units 304 to drive the measured temperatures $T_{zone}$ and/or $T_{sa}$ to the temperature setpoints $T_{sp,zone}$ and/or $T_{sp,sa}$. Equipment controller 614 can provide the control signals to powered VRF components 502 to control the operation of powered VRF components 502, thereby causing powered VRF components 502 to affect the zone temperature $T_{zone}$, the supply air temperature $T_{sa}$, and/or the refrigerant temperature $T_{ref}$.

In some embodiments, equipment controller 614 is configured to provide control signals to power inverter 510. The control signals provided to power inverter 510 can include a battery power setpoint $P_{sp,bat}$ and/or the optimal charge/discharge rate $Bat_{C/D}$. Equipment controller 614 can be configured to operate power inverter 510 to achieve the battery power setpoint $P_{sp,bat}$. For example, equipment controller 614 can cause power inverter 510 to charge battery 313 or discharge battery 313 in accordance with the battery power setpoint $P_{sp,bat}$.

VRF Control Process

Figure 7:
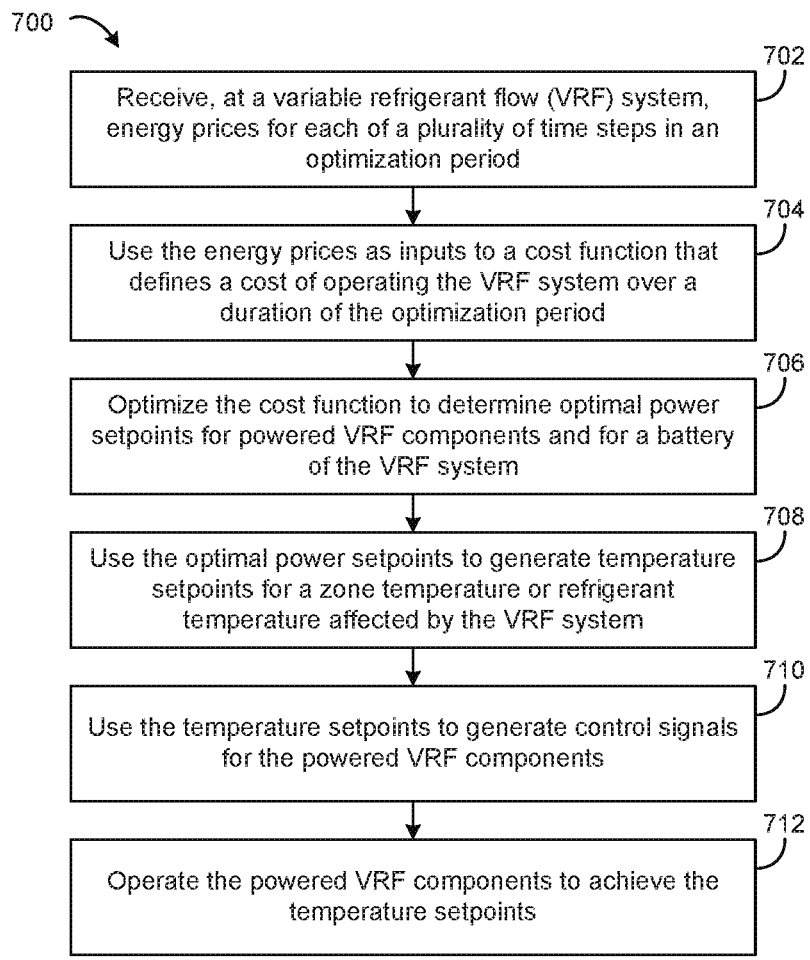
FIG. 7 is a flowchart of a process for operating the VRF system of FIG. 3, according to an exemplary embodiment.

Referring now to FIG. 7, a flowchart of a process 700 for operating a variable refrigerant flow (VRF) system is shown, according to an exemplary embodiment. In some embodiments, process 700 is performed by one or more components VRF system 300, as described with reference to FIGS. 3-6. For example, process 700 can be performed by predictive VRF controller 306.

Process 700 is shown to include receiving, at a VRF system, energy prices for each of a plurality of time steps in an optimization period (step 702). In some embodiments, the energy prices are time-varying energy prices which may have different values for different time steps of the optimization period. The energy prices can include a cost per unit of electricity $C_{ec}$ (e.g., $/kWh) and/or a demand cost $C_{DC}$ (e.g., $/kW of maximum power consumption). In some embodiments, the energy prices include a cost per unit of the heated or chilled refrigerant $C_{vrf}$ supplied to indoor VRF units 304. For example, the cost per unit of the refrigerant $C_{vrf}$ can include a cost incurred to generate a unit of a chilled or heated refrigerant. In some embodiments, the cost $C_{vrf}$ is determined by predictive VRF controller 306 using an equipment performance curve for outdoor VRF units 302, as described with reference to FIG. 6. In other embodiments, the cost per unit of the refrigerant $C_{vrf}$ can be provided as an input to predictive VRF controller 306.

Process 700 is shown to include using the energy prices as inputs to a cost function that defines a cost of operating the VRF system over a duration of the optimization period (step 704). An example of a predictive cost function which can be used in step 704 is shown in the following equation:

$$\min(J) = \sum_{k=1}^{h} C_{ec}(k)P_{comp}(k)\Delta t + \sum_{k=1}^{h} C_{ec}(k)P_{fan}(k)\Delta t + \sum_{k=1}^{h} C_{vrf}(k)F_{cold}(k)\Delta t + \sum_{k=1}^{h} C_{vrf}(k)F_{hot}(k)\Delta t + C_{DC}\max_{k}(P_{grid}(k)) - \sum_{k=1}^{h} C_{ec}(k)P_{bat}(k)\Delta t$$

where $C_{ec}(k)$ is the cost per unit of electricity (e.g., $/kWh) purchased from electric utility 512 during time step k, $P_{comp}(k)$ is the power consumption (e.g., kW) of compressor 402 during time step k, $P_{fan}(k)$ is the power consumption (e.g., kW) of fan 406 during time step k, $C_{vrf}(k)$ is the cost incurred to heat or cool one unit of the refrigerant (e.g., $/liter) provided to indoor VRF units 304 at time step k, $F_{cold}(k)$ is the flow rate of the chilled refrigerant provided to indoor VRF units 304 (e.g., liter/s) at time step k, $F_{hot}(k)$ is the flow rate of the heated refrigerant provided to indoor VRF units 304 (e.g., liter/s) at time step k, $C_{DC}$ is the demand charge rate (e.g., $/kW), the max( ) term selects the maximum power consumption of VRF system 300 (i.e., the maximum value of $P_{grid}(k)$) during any time step k of the optimization period, $P_{bat}(k)$ is the amount of power discharged from battery 313 during time step k, and $\Delta t$ is the duration of each time step k.

Process 700 is shown to include optimizing the cost function to determine optimal power setpoints for powered VRF components and for a battery of the VRF system (step 706). Step 706 can be performed by economic controller 610. In some embodiments, the cost function is optimized subject to a set of optimization constraints. The optimization constraints can include constraints on the zone temperature $T_{zone}$, constraints on the battery power $P_{bat}$, constraints on the state-of-charge of the battery, constraints on the refrigerant flow rate $F_{cold}$ or $F_{hot}$, constraints on the operational domain of the powered VRF components, and/or any other constraints which can be used to limit the optimization to a feasible solution. Examples of such constraints are described in detail with reference to FIG. 6.

The optimal power setpoints generated in step 706 can include an optimal amount of power to purchase from an energy grid (i.e., a grid power setpoint $P_{sp,grid}$), an optimal amount of power to store or discharge from the battery (i.e., a battery power setpoint $P_{sp,bat}$), and/or an optimal amount of power to be consumed by the powered VRF components (i.e., a VRF power setpoint $P_{sp,total}$) at each time step of an optimization period. In some embodiments, these power setpoints are decision variables in the cost function. In other embodiments, one or more of the power setpoints can be calculated based on the values of the decision variables. For example, the power setpoint $P_{sp,total}$ can be calculated by summing $P_{sp,grid}$, $P_{sp,bat}$, and $P_{sp,PV}$. In some embodiments, step 706 includes determining an optimal fan power setpoint $P_{sp,fan}$ and/or an optimal compressor power setpoint $P_{sp,comp}$. The sum of the optimal fan power setpoint $P_{sp,fan}$ and the optimal compressor power setpoint $P_{sp,comp}$ may be equivalent to the amount of power to be consumed by the powered VRF components (e.g., $P_{sp,fan}+P_{sp,comp}=P_{sp,total}$).

Process 700 is shown to include using the optimal power setpoints to generate temperature setpoints for a zone temperature or refrigerant temperature affected by the VRF system (step 708). In some embodiments, step 708 is performed by tracking controller 612. Step 708 can include using the optimal power setpoints $P_{sp,grid}$, $P_{sp,bat}$, $P_{sp,total}$, $P_{sp,fan}$, and/or $P_{sp,comp}$ generated in step 706 to determine a zone temperature setpoint $T_{sp,zone}$ and/or a refrigerant temperature setpoint $T_{sp,ref}$. In some embodiments, step 708 includes generating a zone temperature setpoint $T_{sp,zone}$ and/or a refrigerant temperature setpoint $T_{sp,ref}$ that are predicted to achieve the power setpoint $P_{sp,total}$ for the VRF system. In other words, step 708 may include generating a zone temperature setpoint $T_{sp,zone}$ and/or a refrigerant temperature setpoint $T_{sp,sa}$ that cause the VRF system to consume the optimal amount of power $P_{total}$ determined in step 706. An example of how the temperature setpoints can be generated based on the power setpoints is described in detail with reference to FIG. 6.

Process 700 is shown to include using the temperature setpoints to generate control signals for the powered VRF components (step 710). In some embodiments, step 710 is performed by equipment controller 614. The control signals generated in step 710 may drive the actual (e.g., measured) temperatures $T_{zone}$ and/or $T_{ref}$ to the setpoints. Step 710 can include using any of a variety of control techniques to generate control signals for the powered VRF components. For example, step 710 can include using state-based algorithms, extremum seeking control (ESC) algorithms, proportional-integral (PI) control algorithms, proportional-integral-derivative (PID) control algorithms, model predictive control (MPC) algorithms, or other feedback control algorithms, to generate control signals for the powered VRF components.

The control signals may include on/off commands, speed setpoints for fans 406 and 422, speed setpoints for compressor 402, position setpoints for valves 408, 410, or 424, or other operating commands for individual devices of powered the VRF components. In some embodiments, step 710 includes using a feedback control technique (e.g., PID, ESC, MPC, etc.) to adjust the speed of fan 406 and/or compressor 402 to adjust the amount of heating or cooling applied to the refrigerant by outdoor VRF units 302 to drive the measured refrigerant temperature $T_{ref}$ to the refrigerant temperature setpoint $T_{sp,ref}$. Similarly, step 710 can include using a feedback control technique to control the positions of valves 424 and/or the speeds of fans 422 to adjust the amount of heating or cooling provided by each of indoor VRF units 304 to drive the measured temperatures $T_{zone}$ and/or $T_{sa}$ to the temperature setpoints $T_{sp,zone}$ and/or $T_{sp,sa}$. In some embodiments, step 710 includes generating control signals for a battery power inverter. The control signals for the battery power inverter can include a battery power setpoint $P_{sp,bat}$ and/or the optimal charge/discharge rate $Bat_{C/D}$.

Process 700 is shown to include operating the powered VRF components to achieve the temperature setpoints (step 712). In some embodiments, step 712 includes providing the control signals generated in step 710 to the powered VRF components. The control signals may control the operation of the powered VRF components, thereby causing the powered VRF components to affect the refrigerant temperature $T_{ref}$, the zone temperature $T_{zone}$, and/or the supply air temperature $T_{sa}$. In some embodiments, step 712 includes operating the battery power inverter to achieve the battery power setpoint $P_{sp,bat}$. For example, step 712 can include causing the battery power inverter to charge battery 313 or discharge battery 313 in accordance with the battery power setpoint $P_{sp,bat}$.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A variable refrigerant flow (VRF) system for a building, the VRF system comprising:
   an outdoor VRF unit comprising one or more powered VRF components configured to apply heating or cooling to a refrigerant;
   a plurality of indoor VRF units configured to receive the heated or cooled refrigerant from the outdoor VRF unit and to use the heated or cooled refrigerant to provide heating or cooling to a plurality of building zones;
   a battery configured to store electric energy and discharge the stored electric energy for use in powering the powered VRF components; and
   a predictive VRF controller configured to optimize a predictive cost function to determine an optimal amount of electric energy to purchase from an energy grid and an optimal amount of electric energy to store in the battery or discharge from the battery for use in powering the powered VRF components at each time step of an optimization period.

2. The VRF system of claim 1, further comprising one or more photovoltaic panels configured to collect photovoltaic energy;
   wherein the predictive VRF controller is configured to determine an optimal amount of the photovoltaic energy to store in the battery and an optimal amount of the photovoltaic energy to be consumed by the powered VRF components at each time step of the optimization period.

3. The VRF system of claim 1, wherein the outdoor VRF unit comprises a refrigeration circuit including a heat exchanger, a compressor configured to circulate the refrigerant through the heat exchanger, and a fan configured to modulate a rate of heat transfer in the heat exchanger;
   wherein the powered VRF components comprise the compressor and the fan;
   wherein the predictive cost function accounts for a cost of operating the compressor and the fan at each time step of the optimization period.

4. The VRF system of claim 1, wherein the predictive cost function accounts for:
   a cost of the electric energy purchased from the energy grid; and
   a cost savings resulting from discharging the stored electric energy from the battery at each time step of the optimization period.

5. The VRF system of claim 1, wherein the predictive VRF controller is configured to:
   receive energy pricing data defining a cost per unit of the electric energy purchased from the energy grid at each time step of the optimization period; and
   use the energy pricing data as inputs to the predictive cost function.

6. The VRF system of claim 1, wherein the predictive cost function accounts for a demand charge based on a maximum power consumption of the VRF system during a demand charge period that overlaps at least partially with the optimization period;
   wherein the predictive VRF controller is configured to receive energy pricing data defining the demand charge and to use the energy pricing data as inputs to the predictive cost function.

7. The VRF system of claim 1, wherein the predictive VRF controller is configured to:
   determine optimal power setpoints for the powered VRF components and for the battery at each time step of the optimization period;
   use the optimal power setpoints to determine optimal temperature setpoints for the building zones or the refrigerant at each time step of the optimization period; and
   use the optimal temperature setpoints to generate control signals for the powered VRF components and for the battery at each time step of the optimization period.

8. A variable refrigerant flow (VRF) system for a building, the VRF system comprising:
   an outdoor VRF unit comprising one or more powered VRF components configured to apply heating or cooling to a refrigerant;
   a plurality of indoor VRF units configured to receive the heated or cooled refrigerant from the outdoor VRF unit and to use the heated or cooled refrigerant to provide heating or cooling to a plurality of building zones;
   one or more photovoltaic panels configured to collect photovoltaic energy; and
   a predictive VRF controller configured to optimize a predictive cost function to determine an optimal amount of electric energy to purchase from an energy grid and an optimal amount of electric energy to be consumed by the powered VRF components at each time step of an optimization period;
   wherein the predictive VRF controller is configured to determine an optimal amount of the photovoltaic energy to store in a battery and an optimal amount of the photovoltaic energy to be consumed by the powered VRF components at each time step of the optimization period.

9. The VRF system of claim 8, wherein the outdoor VRF unit comprises a refrigeration circuit including a heat exchanger, a compressor configured to circulate the refrigerant through the heat exchanger, and a fan configured to modulate a rate of heat transfer in the heat exchanger;
   wherein the powered VRF components comprise the compressor and the fan;
   wherein the predictive cost function accounts for a cost of operating the compressor and the fan at each time step of the optimization period.

10. The VRF system of claim 8, wherein the predictive cost function accounts for a cost of the electric energy purchased from the energy grid at each time step of the optimization period.

11. The VRF system of claim 8, wherein the predictive VRF controller is configured to:
    receive energy pricing data defining a cost per unit of electric energy purchased from the energy grid at each time step of the optimization period; and
    use the energy pricing data as inputs to the predictive cost function.

12. The VRF system of claim 8, wherein the predictive cost function accounts for a demand charge based on a maximum power consumption of the VRF system during a demand charge period that overlaps at least partially with the optimization period;
    wherein the predictive VRF controller is configured to receive energy pricing data defining the demand charge and to use the energy pricing data as inputs to the predictive cost function.

13. The VRF system of claim 8, wherein the predictive VRF controller is configured to:
    determine optimal power setpoints for the powered VRF components at each time step of the optimization period;

use the optimal power setpoints to determine optimal temperature setpoints for the building zones or the refrigerant at each time step of the optimization period; and use the optimal temperature setpoints to generate control signals for the powered VRF components at each time step of the optimization period.

14. A method for operating a variable refrigerant flow (VRF) system, the method comprising:

receiving, at a predictive controller of the VRF system, energy pricing data defining energy prices for each of a plurality of time steps in an optimization period;

using the energy pricing data as inputs to a predictive cost function that defines a cost of operating the VRF system over a duration of the optimization period;

optimizing the predictive cost function to determine optimal power setpoints for one or more powered components of the VRF system and for a battery of the VRF system;

using the optimal power setpoints to generate temperature setpoints for a zone temperature or refrigerant temperature affected by the VRF system;

using the temperature setpoints to generate control signals for the powered components of the VRF system; and operating the powered components of the VRF system to achieve the temperature setpoints.

15. The method of claim 14, wherein optimizing the predictive cost function comprises determining an optimal amount of electric energy to purchase from an energy grid and an optimal amount of electric energy to store in the battery or discharge from the battery for use in powering the powered components of the VRF system at each time step of the optimization period.

16. The method of claim 14, further comprising operating a refrigeration circuit in an outdoor VRF unit of the VRF system to apply heating or cooling to a refrigerant, the refrigeration circuit comprising a heat exchanger, a compressor configured to circulate the refrigerant through the heat exchanger, and a fan configured to modulate a rate of heat transfer in the heat exchanger;

wherein the powered components of the VRF system comprise the compressor and the fan of the outdoor VRF unit;

wherein the predictive cost function accounts for a cost of operating the compressor and the fan at each time step of the optimization period.

17. The method of claim 14, further comprising operating a fan of an indoor VRF unit of the VRF system to transfer heat between the refrigerant and one or more building zones;

wherein the powered components of the VRF system comprise the fan of the indoor VRF unit.

18. The method of claim 14, wherein the predictive cost function accounts for a demand charge based on a maximum power consumption of the VRF system during a demand charge period that overlaps at least partially with the optimization period;

the method further comprising using the energy pricing data as inputs to the predictive cost function to define the demand charge.

19. The method of claim 14, further comprising:

obtaining photovoltaic energy from one or more photovoltaic panels of the VRF system; and determining an optimal amount of the photovoltaic energy to store in the battery and an optimal amount of the photovoltaic energy to be consumed by the powered components of the VRF system at each time step of the optimization period.

* * * * *